(12) United States Patent
Sasaki et al.

(10) Patent No.: US 10,364,582 B2
(45) Date of Patent: Jul. 30, 2019

(54) DEVICE FOR REPAIRING CRACK IN WALL

(71) Applicant: SAKAEGUMI CORPORATION, Tono-shi, Iwate (JP)

(72) Inventors: Takahiko Sasaki, Tono (JP); Yoshihiro Sasaki, Tono (JP)

(73) Assignee: SAKAEGUMI CORPORATION, Tono-Shi, Iwate (JP)

( * ) Notice: Subject to any disclaimer, the term of this patent is extended or adjusted under 35 U.S.C. 154(b) by 0 days.

(21) Appl. No.: 15/758,611

(22) PCT Filed: Aug. 23, 2016

(86) PCT No.: PCT/JP2016/074522
§ 371 (c)(1),
(2) Date: Mar. 8, 2018

(87) PCT Pub. No.: WO2017/073148
PCT Pub. Date: May 4, 2017

(65) Prior Publication Data
US 2018/0251990 A1    Sep. 6, 2018

(30) Foreign Application Priority Data
Oct. 29, 2015  (JP) .................................. 2015-212477

(51) Int. Cl.
*E04G 23/02* (2006.01)
*B05C 5/02* (2006.01)
(Continued)

(52) U.S. Cl.
CPC ............ *E04G 23/0211* (2013.01); *B05C 5/02* (2013.01); *B05C 21/00* (2013.01); *B25B 11/007* (2013.01); *F16D 41/00* (2013.01); *F16B 47/00* (2013.01)

(58) Field of Classification Search
CPC .................................................... E04G 23/0211
(Continued)

(56) References Cited

U.S. PATENT DOCUMENTS 926,129 A * 6/1909 Murrie .................... B29C 43/18
                                                       425/12
3,102,829 A * 9/1963 Rathbun, Jr. ....... E04G 23/0211
                                                       118/410
(Continued)

FOREIGN PATENT DOCUMENTS

JP     S60-197383 A    10/1985
JP     S61-244912 A    10/1986
(Continued)

OTHER PUBLICATIONS

PCT/ISA/210, "International Search Reprot for International Application No. PCT/JP2016/074522," Oct. 18, 2016.
(Continued)

*Primary Examiner* — Robert Canfield
(74) *Attorney, Agent, or Firm* — Manabu Kanesaka

(57) ABSTRACT

A device for repairing a crack in a wall includes an injection nozzle that has a nozzle part, and an adsorption disk fixed to a supporting shaft in which a suction passage for sucking air is formed and can be adsorbed to a wall surface by sucking air through the suction passage, and can be detached from the wall surface by releasing the suction, an arm having a front end part and a rear end part in the axial direction, and is supported by the supporting shaft in the midpoint of the axial direction through the first universal joint and supports an inflow pipe of the injection nozzle in the front end part through a second universal joint, and a plurality of contact members attached to the rear end part of the arm, the front end thereof contacting the wall surface, and receives the moment load generated in the arm.

14 Claims, 11 Drawing Sheets

(51) Int. Cl.
*B05C 21/00* (2006.01)
*F16D 41/00* (2006.01)
*B25B 11/00* (2006.01)
*F16B 47/00* (2006.01)

(58) Field of Classification Search
USPC .................................................. 425/13, 12
See application file for complete search history.

(56) References Cited

U.S. PATENT DOCUMENTS

| | | | | |
|---|---|---|---|---|
| 3,988,400 | A * | 10/1976 | Luhman, III | B29C 73/025 156/94 |
| 4,291,866 | A * | 9/1981 | Petersen | B25B 11/007 156/94 |
| 4,921,411 | A * | 5/1990 | Ottenheimer | B29C 73/025 156/94 |
| 5,234,325 | A * | 8/1993 | Hill | B29C 73/025 156/94 |
| 5,565,217 | A * | 10/1996 | Beckert | B29C 73/025 156/94 |
| 2001/0030095 | A1 | 10/2001 | Nagaya et al. | |
| 2002/0100537 | A1* | 8/2002 | Evans | B29C 73/025 156/94 |
| 2004/0067272 | A1* | 4/2004 | Evans | B29C 73/025 425/12 |
| 2006/0280824 | A1* | 12/2006 | Chang | B29C 73/025 425/13 |
| 2011/0001024 | A1* | 1/2011 | Cho | B25B 11/007 248/205.9 |

FOREIGN PATENT DOCUMENTS

| | | | | |
|---|---|---|---|---|
| JP | 02225771 | A | * | 9/1990 |
| JP | H04-49376 | A | | 2/1992 |
| JP | H04-118467 | A | | 4/1992 |
| JP | H04-73612 | U | | 6/1992 |
| JP | 2001-295868 | A | | 10/2001 |
| JP | 2003-129675 | A | | 5/2003 |
| JP | 2004092029 | A | * | 3/2004 |
| JP | 2007-200738 | A | | 8/2007 |
| JP | 3142597 | U | | 6/2008 |
| JP | 2008-157336 | A | | 7/2008 |
| JP | 2008297726 | A | * | 12/2008 |
| JP | 4351712 | B2 | | 10/2009 |
| JP | 6012665 | B2 | * | 10/2016 |
| JP | 2017082497 | A | * | 5/2017 ............... B05C 5/02 |

OTHER PUBLICATIONS

PCT/IB/338, "Notification of Transmittal of Translation of the International Preliminary Report on Patentability for International Application No. PCT/JP2016/074522," dated May 11, 2018.

PCT/IB/373, "International Preliminary Report on Patentability for International Application No. PCT/JP2016/074522," dted May 1, 2018.

PCT/ISA/237, "Written Opinion of the International Searching Authority for International Application No. PCT/JP2016/074522," dated Oct. 18, 2016.

* cited by examiner

DEVICE FOR REPAIRING CRACK IN WALL

RELATED APPLICATIONS

The present application is National Phase of International Application No. PCT/JP2016/074522 filed Aug. 23, 2016, and claims priority from Japanese Application No. 2015-212477, filed Oct. 29, 2015, the disclosure of which is hereby incorporated by reference herein in its entirety.

TECHNICAL FIELD

The present invention relates to a device for repairing a crack in a wall appeared in concrete or mortar walls by filling filler therein.

BACKGROUND ART

Conventionally, as a device for repairing a crack in a wall of this type, one disclosed in Japanese Patent No. 4351712 (Patent Document 1) previously proposed by the applicant of the present application is known, for example.

As shown in FIG. 11, this device Sa for repairing a crack in a wall includes an injection nozzle 100 having a nozzle part 101, the front end thereof being arranged at a crack K in a wall W, and injecting filler into the crack K and an inflow pipe 102 that is connected to the nozzle part 101 and flows the filler into the nozzle part 101; an adsorption disk 105 that is fixed to a supporting shaft 104 in which a suction passage 103 for sucking air is formed and is adsorbed to the wall surface Wa by suction of air through the suction passage 103 of the supporting shaft 104 and can be detached from the wall surface Wa by release of suction; an arm 108 that is supported by a supporting shaft 104 through a first universal joint 106 at an intermediate part and supports an inflow pipe 107 of the injection nozzle 100 through a second universal joint 102 at a front end part; and a contact member 110 that is attached to a rear end part of the arm 108 through a third universal joint 109 and receives the moment load generated in the arm 108 when the front end thereof contacts the wall surface Wa at the time of filling of filler by the injection nozzle 100. The contact member 110 is provided at the rear end part of the arm 108 such that the contact member 110 can move up and down, and is always urged downwardly by a coil spring 111.

When the device Sa for repairing a crack K fills filler into the crack K in a wall W, the optimum position of the injection nozzle 100 is selected according to the state of the crack K in the wall surface Wa to be repaired. Then, the adsorption disk 105 is disposed at a position in the vicinity of the selected position where no crack K is present. The adsorption disk 105 is adsorbed and fixed to the wall surface Wa, and the injection nozzle 100 is positioned at the selected position. In this state, the filler discharged from the injection nozzle 100 is filled in the crack K. At this time, a high pressure caused by transferring of the filler acts on the injection nozzle 100 to generate a reaction force, and the moment is generated in the arm 108 around the horizontal axis Q orthogonal to the direction of the axial direction P thereof. Therefore, the arm 108 is forced to rotate around this horizontal axis Q. However, since the contact member 110 attached to the rear end part of the arm 108 contacts the wall surface Wa and receives the moment load generated in the arm 108, the adsorption disk 105 is hardly peeled off from the wall surface Wa. Therefore, it is possible to reliably fill filler in the crack K to be repaired by transferring the filler under high pressure from the injection nozzle 100.

Further, since the contact member 110 is urged downwardly (namely, in the direction advancing toward the wall surface) by the coil spring 111, the contact member 110 elastically contacts the wall surface Wa and satisfactorily follows the irregularities of the wall surface Wa.

RELATED ART DOCUMENT

Patent Document

Patent Document 1: Japan Patent No. 4351712

SUMMARY OF THE INVENTION

Problems to be Solved by the Invention

In the above-mentioned conventional device Sa for repairing a crack in a wall as described above, the contact member 110 elastically contacts the wall surface Wa and satisfactorily follows the irregularities of the wall surface Wa. However, since the arm 108 is supported at two points, that is, at the injection nozzle 100 and the contact member 110, depending on the state of the irregularities of the wall surface Wa and the degree of adsorption of the adsorption disk 105, contact balance of the injection nozzle 100 and the contact member 110 relative to the wall surface Wa was deteriorated in some cases. In that case, there was a problem that the arm 108 wobbled and was tilted in the lateral direction, the nozzle part 101 of the injection nozzle 100 was uplifted from the crack K or was separated from the crack K. In this case, leakage of the filler occurred, which led to insufficient filling or impossibility in substantial filling.

The present invention has been attained taking the above problems into consideration, and an object thereof is to provide a device for repairing a crack in a wall, wherein, even if the contact balance of an injection nozzle and a contact member relative to a wall surface is deteriorated to a certain extent, an arm is hardly tilted laterally, and an injection nozzle is prevented from being uplifted or separated from the crack, thereby ensuring reliable injection of filler into the crack.

Means for Solving the Problem

In order to attain the above-mentioned object, the device for repairing a crack in a wall comprising:

an injection nozzle that has a nozzle part, with a front end being positioned on a crack in a wall and injects filler into the crack, and an inflow pipe that is connected to the nozzle part and sends filler to the nozzle part, an adsorption disk that is fixed to a supporting shaft in which a suction passage for sucking air is formed and can be adsorbed to a wall surface by sucking of air through the suction passage, and can be detached from the wall surface by releasing of the suction, an arm having a front end part and a rear end part in the axial direction, and is supported by the supporting shaft in the midpoint of the axial direction through the first universal joint and supports an inflow pipe of the injection nozzle in the front end part through the second universal joint, and a plurality of contact members that are attached to the rear end part of the arm, the front end thereof contacting the wall surface, and receives the moment load generated in the arm when filling filler by means of the injection nozzle, wherein the plurality of contact members are arranged in a direction orthogonal to the axial direction of the arm. The contact member may be configured so that it elastically contacts the wall surface or may be configured so that it contacts not elastically.

Due to such a configuration, when filler is filled in a crack in a wall, an optimum position of an injection nozzle is selected according to the condition of a crack in a wall to be repaired. An adsorption disk is arranged at a position where no crack is present in the vicinity of this position, and the adsorption disk is adsorbed and fixed to the wall surface. The injection nozzle is positioned at the selected position of a crack. In this state, when filler is discharged from the injection nozzle, the filler is filled in the crack. At this time, a high pressure acts on the injection nozzle due to transferring of the filler, a reaction force is generated, and the moment around the horizontal axis orthogonal to the axial direction of the arm is generated in the arm, and therefore, the arm is forced to rotate around this horizontal axis. However, since the contact member attached to the rear end part of the arm contacts the wall surface to receive the moment load generated in the arm, the adsorption disk is hardly peeled off from the wall surface. Therefore, it is possible to reliably fill the crack to be repaired with the filler by transferring of the filler from the injection nozzle under a high pressure.

With the midpoint of the axial direction thereof being as a center, the front side of the arm is supported by the injection nozzle and the rear side of the arm is supported by the plurality of contact members. That is, the arm is supported at more than three points in the front and back. Therefore, even if the arm is forced to incline in the lateral direction due to the irregularities of the wall surface and the degree of adsorption of the adsorption disk, the arm is prevented from being tilted in the lateral direction. As a result, the injection nozzle is prevented from being uplifted or being separated from the crack, and the filler is reliably filled in the crack. Further, it is possible to improve the reliability of injection of the filler.

Preferably, each of the plurality of contact members is formed of a shaft body provided at the rear end part of the arm such that it can move up and down, and is provided with a lock mechanism that locks each of the contact members at a desired position.

Since it is possible to lock each of the contact members at a desired position, the mutual balance of the plurality of contact members can be adjusted. As a result, the support by the arm can be more stabilized.

Further, preferably, the shaft body comprises a contact head that contacts the wall surface and a male screw rod that extends from the contact head and has a diameter smaller than that of the contact head,
at the rear end part of the arm, a rear end member in which a plurality of insertion holes into which the male screw rods of the plurality of the contact members are inserted are formed is provided,
the lock mechanism comprises
a pressing coil spring that is loosely fitted to the male screw rod in a compressed state between the lower surface of the rear end member and the contact head of the male screw rod, and
a lock nut that is screwed with the male screw rod on the upper surface side of the rear end member.

Due to such a configuration, only by moving up and down a shaft body relative to the insertion hole and locking by means of a lock nut, the shaft body can be positioned and hence, can be easily adjusted. Further, during use, since the contact head of the male screw rod is elastically pressed against the wall surface, even if the wall surface is not flat and uneven, the contact head follows the wall surface, and stable support is realized.

Further, preferably, the above-mentioned shaft body comprises a contact head that contacts the wall surface and a male screw rod that extends from the contact head and has a diameter smaller than that of the contact head, and that, on the rear end part of the arm, a rear end member in which a plurality of insertion holes through which the plurality of the male screw rods are inserted is provided, and the lock mechanism is formed of a lock nut that is screwed with the male screw rod at each of the lower surface side and the upper surface side of the rear end member.

It is possible to adjust the shaft body easily due to a simple configuration that the shaft body can be moved up and down relative to the insertion hole and locked by means of a lock nut.

Further, preferably, the distance L1 between the central axis of the supporting shaft and the central axis of the injection nozzle is shorter than a distance L2 between the central axis of the supporting shaft and the central axis of the contact member. Preferably, the distance relationship may $2L1 \leq L2$.

The momentum load generated in the arm when the filler is discharged from the injection nozzle is received by the contact member. With L1 being smaller than L2, the length of the arm on the side of the contact member is allowed to be longer than the length of the arm on the side of the injection nozzle, the moment load generated in the arm is received reliably by the contact member.

Further, preferably, the first universal joint comprises a spherical rotating member having a through hole through which the supporting shaft is inserted and a ring-like retention ring that rotatably retains the spherical rotating member,
a male screw is formed on an outer periphery of the supporting shaft,
a pressing coil spring is provided on the supporting shaft so that the pressing coil spring is loosely fitted to the supporting shaft in a compressed state between an upper surface of the adsorption disk and a lower surface of the arm, and
a regulation nut part that is screwed with the male screw on the supporting shaft on the upper surface side of the arm and regulates the upward movement of the arm is provided.

By tightening the regulation nut part, upward movement of the arm is regulated, and the adsorption disk is always urged against wall surface side by the pressing coil spring. Therefore, the adsorption disk can be fitted to the wall surface reliably without rattling. This is particularly effective when adsorbing the adsorption disk to the ceiling. Further, by the adsorption force of the adsorption disk, the arm itself is pulled towards the adsorption disk side against the urging force of the pressing coil spring, the injection nozzle and the contact member are pushed against the wall surface preferably. As a result, uplifting and separation of the injection nozzle from the crack can be prevented, whereby filler can be reliably filled in the crack.

Preferably, the regulation nut part comprises
a nut main body having a female screw that is screwed with the male screw of the supporting shaft, and
an operation flange that is integrally formed with the nut main body on the outer periphery of the nut main body in order to be grasped and to rotate the nut main body manually.

By rotating the nut main body by manual operation of the operation flange, urging force of the pressing coil spring can be easily adjusted, whereby the fitting condition of the adsorption disk to the wall surface and the pushing condition of the injection nozzle and the contact member against the wall surface can be adjusted easily and suitably, whereby operability can be improved.

Further, preferably, the regulation nut part comprises a pair of a first nut and a second nut provided on one end side of the first nut, on an inner periphery of the first nut, a female screw that is screwed with the male screw on the supporting shaft is formed, the first nut has, on part of the one end side, a tapered pipe having a tapered shape that extends along the inner periphery on which a female screw is formed and having an outer periphery that is narrowed from a base end to a front end, on an inner periphery of the second nut, a female screw that is screwed with the male screw of the supporting shaft is formed, and the second nut has, on part of one end side, a tapered recess that connects the outer periphery of the tapered pipe of the first nut.

When the second nut is tightened on the first nut, due to the tapered recess of the second nut, the tapered pipe of the first nut is pressed by the tapered concave part of the second nut and the diameter of the tapered pipe is reduced. As a result, the female screw of the first nut is pressed against the male screw of the supporting shaft, the regulation nut part is not easily moved with respect to the supporting shaft, whereby the arm is reliably regulated. Therefore, since the movement of the arm due to looseness of the regulation nut part is prevented at the time of repeated use, variations in the pressing force of the injection nozzle against the wall surface are suppressed, and the filler is reliably filled in a crack.

Further, preferably, the second universal joint comprises a spherical rotating member having a through hole through which the inflow pipe is inserted and a ring-like retention ring that rotatably retains the spherical rotating member, a male screw is formed on an outer periphery of the inflow pipe, a pair of lock nut parts that are screwed with the male screw of the inflow pipe on an upper surface side and a lower surface side of the arm to lock the inflow pipe, each of the pair of the lock nut parts comprises a nut main body in which a female screw that is screwed with the male screw of the inflow pipe is formed, and an operation flange that is integrally formed with the outer periphery of the nut main body in order to be grasped and to rotate manually the nut main body.

When the pair of lock nut parts are tightened, the inflow pipe is fixed so that the inflow pipe is not moved easily. As a result, the injection nozzle is reliably positioned. Since the nut main body is rotated by manual operation of the operation flange, the operability of the lock nut part is improved.

Further, preferably, the second universal joint comprises a spherical rotating member having a through hole through which the inflow pipe is inserted and a ring-like retention ring that rotatably retains the spherical rotating member, on an outer periphery of the inflow pipe, a male screw is formed, on an upper surface side and a lower surface side of the arm, a pair of lock nut parts is provided so that the pair of lock not parts is screwed with the male screw of the inflow pipe to lock the inflow pipe, Of the pair of lock nut parts, at least the lock nut part on the lower surface side comprises a first nut and a second nut provided on one end side of the first nut, on an inner periphery of the first nut, a female screw that is screwed with the male screw of the inflow pipe is formed, the first nut has, on part of the one end side, a tapered pipe having a tapered shape that extends along the inner periphery on which a female screw is formed and having an outer periphery that is narrowed from a base end to a front end, on an inner periphery of the second nut, a female screw that is screwed with the male screw of the inflow pipe is formed, the second nut has, on part of its one end side, a tapered recess, the tapered recess has a tapered surface that connects the outer periphery of the tapered pipe of the first nut, and by tightening of the second nut towards the first nut side, the tapered recess reduces a diameter of the tapered pipe to make the tapered pipe to press against the male screw of the inflow pipe.

When tightening the second nut against the first nut, the tapered pipe of the first nut is pressed by the tapered recess of the second nut, and the diameter of the tapered pipe is reduced. As a result, the female screw of the second nut is pressed against the male screw of the inflow pipe, and the lock nut part is not moved easily with respect to the supporting shaft, whereby the injection nozzle is reliably positioned at the time of fitting to the wall surface. Therefore, since the upward movement of the arm due to looseness of the regulation nut part is prevented at the time of repeated use, variations in the pressing force of the injection nozzle against the wall surface are suppressed, and the filler is reliably filled in a crack. In the case where both of the pair of lock nut parts are constituted by a combination of the first nut and the second nut respectively, the injection nozzle is positioned more reliably and rattling is prevented.

Further, preferably, the adsorption disk comprises an adsorption main body that is fixed to the supporting shaft, and a ring-like packing that is provided in a protruded way on the adsorption main body, elastically contacts the wall surface and forms, on inside of the ring-kike packing, a recess that communicates with the suction passage of the supporting shaft and faces to the wall surface, and wherein the adsorption main body is formed of a transparent resin.

When fitting the adsorption disk to the wall surface, the adsorption disk is suctioned by a vacuum pump. When there is a crack on a part of the wall surface at which the adsorption disk is disposed, the filler is suctioned to the adsorption disk through the crack. As a result, there may be a fear that the filler reaches the vacuum pump from the adsorption disk to damage the vacuum pump. However, since the main body of the adsorption disk is made transparent, the filler suctioned in the adsorption disk from the crack can be visibly recognized. In this case, by stopping the suction and moving the adsorption disk to another place, suctioning of the filler into a vacuum pump is prevented, whereby safety can be ensured.

Further, preferably, the nozzle part comprises a nozzle main body connected to the inflow pipe, a discharge port in a flared shape that is gradually expanding, and a resin-made cushioning member that is provided on an opening edge part of the nozzle main body and elastically contacts the wall surface.

Since the discharge port of the nozzle main body has a wide opening in a flared shape that gradually expands, it is easy to allow the discharge port to be aligned on the line of the crack easily, and it is possible to reliably discharge the filler.

Further, preferably, the nozzle main body has an engaging projection that bites an outer periphery of the cushioning member and engages with the cushioning member.

Even if used repeatedly, the cushioning member is hardly removed from the nozzle main body. As a result, durability of the nozzle part is improved.

Preferably, the device for repairing a crack in a wall comprises a supply pipe that is connected to the inflow pipe in order to supply filler to the inflow pipe, and the supply pipe has a connection port that is connected to the inflow pipe and first, second and third branched pipes that communicate with the connection port and are branched into three directions. Each of the first, second and third branched pipes has a manual opening/closing valve for opening and closing the branched pipe.

Due to such a configuration, a pipe line for supplying a certain type of filler is connected to the first branched pipe, and a pipe line for supplying another type of filler is connected to the second branched pipe, and the remaining third branched pipe is used for cleaning with air. First, when a certain type of filler is injected, the opening and closing valve of the first branched pipe is open, and those of the other tubes are closed. When another type of filler is injected, the opening and closing valve of the third branched pipe is open, and air is supplied thereto to clean the pipeline. Subsequently, the opening and closing valve of the first branched pipe is closed, the third branched pipe is closed and the second branched pipe is open, and another type of filler is injected. When a certain type of filler is filled, cleaning is conducted in the same way as mentioned above, and the same procedures as mentioned above are conducted. As mentioned above, since two types of filler can be injected while appropriately switching the type of filler in the single apparatus, it is possible to inject two types of filler with a significant working efficiency. For example, it is significantly advantageous when injecting filler that can be impregnated with concrete in order to mix filler well in the concreate of the crack.

Further, preferably, the device comprises a switching valve between the suction passage of the supporting shaft and a suction pipe from the vacuum pump, and the switching valve that comprises a spring urging the switching valve to a normal position at which the suction by the vacuum pump is effective, and a push button that positions, against the urging force of the spring, the switching valve at a working position at which the suction passage is opened to the atmosphere to invalidate the suction by the vacuum pump.

When using a device for repairing a crack in a wall, with the vacuum pump being driven, the push button of the switching valve is pushed to the working position to invalidate the suction by the vacuum pump, and the injection nozzle is positioned at a crack of a wall surface to be repaired, and an adsorption disk is positioned at an appropriate position where no crack is generated.

Subsequently, the state in which the push button of the switching valve is released, and the push button is positioned at a normal position, thereby to validate the suction by the vacuum pump. As a result, the adsorption disk is adsorbed to the wall surface and fixed. When filler is discharged from the injection nozzle in this state, the filler is filled in the crack. When the filling is completed, the push button of the switching valve is pushed. As a result, suction by the vacuum pump is invalidated, and adsorption of the adsorption disk is released.

Subsequently, the device for repairing a crack is moved to another place, and the adsorption disk is adsorbed to the wall surface in the same manner as mentioned above, and filler is filled in a crack from the injection nozzle. In this case, only by pushing the push button and releasing the push button of the switching valve, release of adsorption of the adsorption disk and adsorption by the adsorption disk can be conducted. Therefore, the operation is significantly simple, and the device for repairing a crack can be smoothly moved, whereby workability can be greatly improved.

During the movement of the device for repairing a crack, pushing of the push button may be released to allow the adsorption disk to be adsorbed to the wall surface.

Advantageous Effects of the Invention

According to the present invention, as for the arm, with the midpoint of the axial direction thereof being as the center, the front side thereof is supported by the injection nozzle and the rear side thereof is supported by a plurality of contact members. That is, the arm is supported at three or more points in the front and the rear. Therefore, when the adsorption disk is adsorbed to the wall surface and fixed, the injection nozzle is positioned at a selected position of a crack, and filler is discharged from the injection nozzle, even though the arm tends to be tilted in the lateral direction due to the state of irregularities of the wall surface, the state of adsorption of the adsorption disk, etc., tilting of the arm in the lateral direction is prevented. As a result, uplifting or separation of the injection nozzle from the crack can be prevented, filler is reliably filled in the crack, and reliability of the injection of filler can be improved.

MODE FOR CARRYING OUT THE INVENTION

Herein below, the device for repairing a crack in a wall according to the embodiment of the present invention will be explained in detail with reference to the attached drawings.

Figure 1:
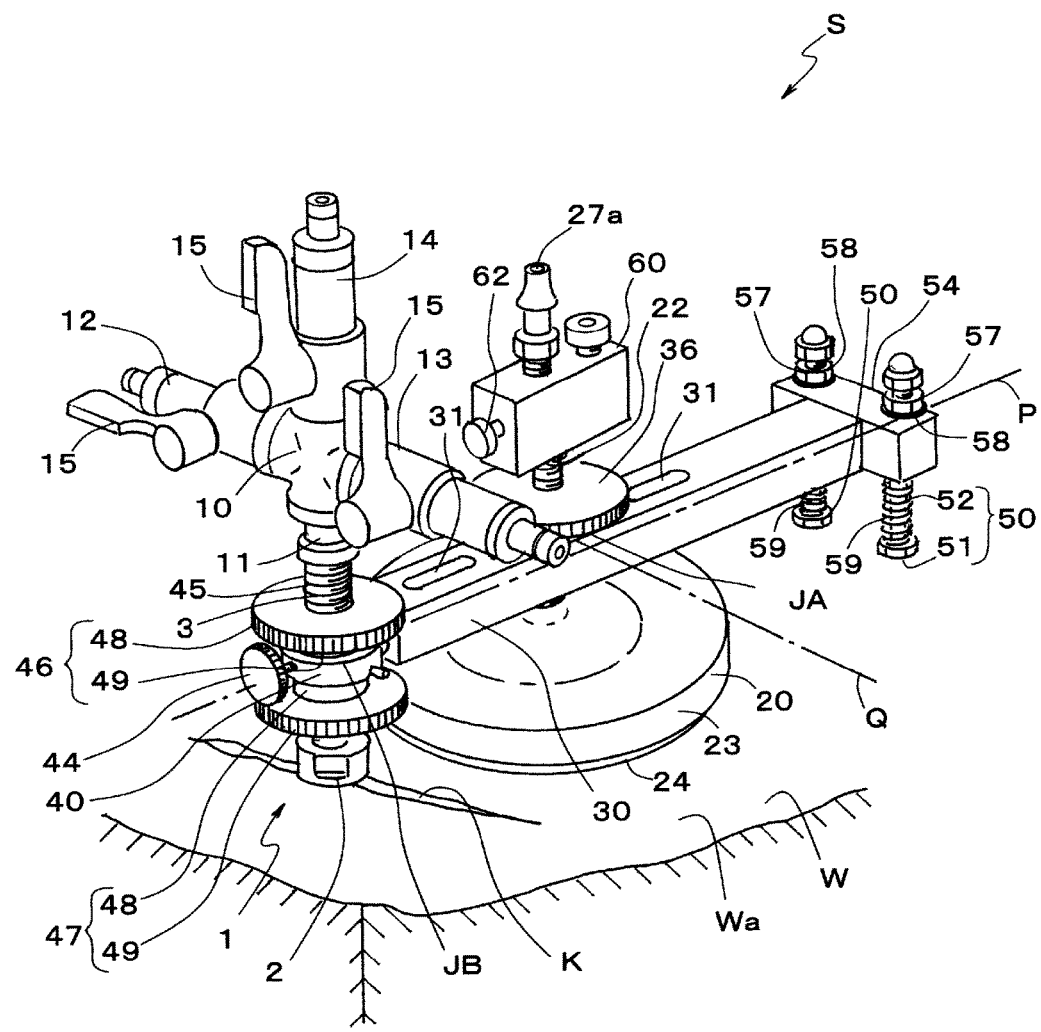
FIG. 1 shows a perspective view of the device for repairing a crack in a wall according to an embodiment of the present invention.

FIGS. 1 to 5 each show the device S for repairing a crack in a wall according to the present embodiment. As shown in FIG. 1, a crack K generated in the wall W is appeared on a wall surface Wa. For example, two types of filler are filled in the crack K on the wall surface Wa by the device S for repairing a crack K in the wall surface Wa according to the present embodiment. As the two types of filler, for example, a pre-treatment filler that is impregnated in concrete of the crack K to allow the concrete to be dense, and a main filler that blocks the crack K are used.

The device S for repairing a crack in a wall comprises: as the basic configuration, an injection nozzle 1 for injecting filler into a crack K in the wall W; an adsorption disk 20 that can be adsorbed to the wall surface Wa by suction of air and can be detached from the wall surface Wa by release of suction; an arm 30 that has a front end part and a rear end part in the longitudinal direction (axial direction), and in the midpoint of the axial direction, is supported by a supporting shaft 22 that supports the adsorption disk 20 through a first universal joint JA, and at the front end thereof, supports the injection nozzle 1 through a second universal joint JB; and plural contact members 50 that are attached to the rear end part of the arm 30, the front end part of which contacts the wall surface Wa, and receives momentum load generated in the arm 30 at the time of filling filler by the injection nozzle 1.

Figure 2:
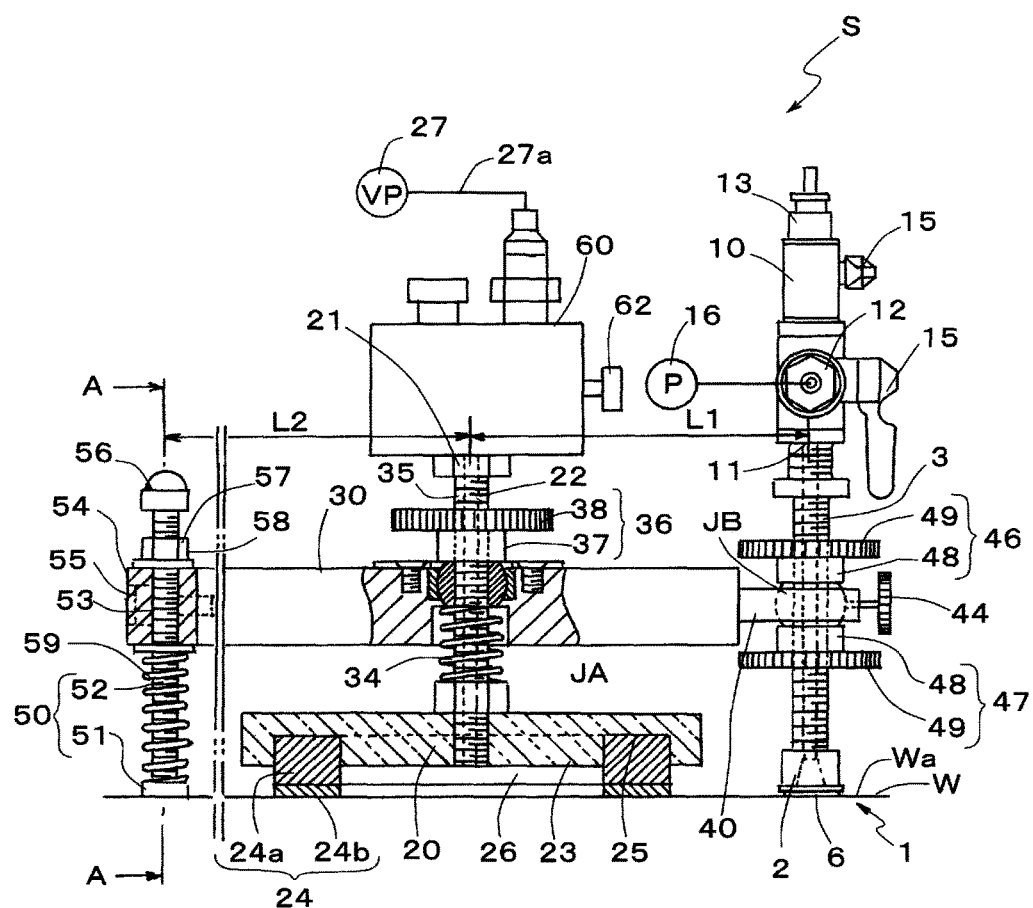
FIG. 2 shows a partially cutaway side view of the device for repairing a crack in a wall according to an embodiment of the present invention.
Figure 5:
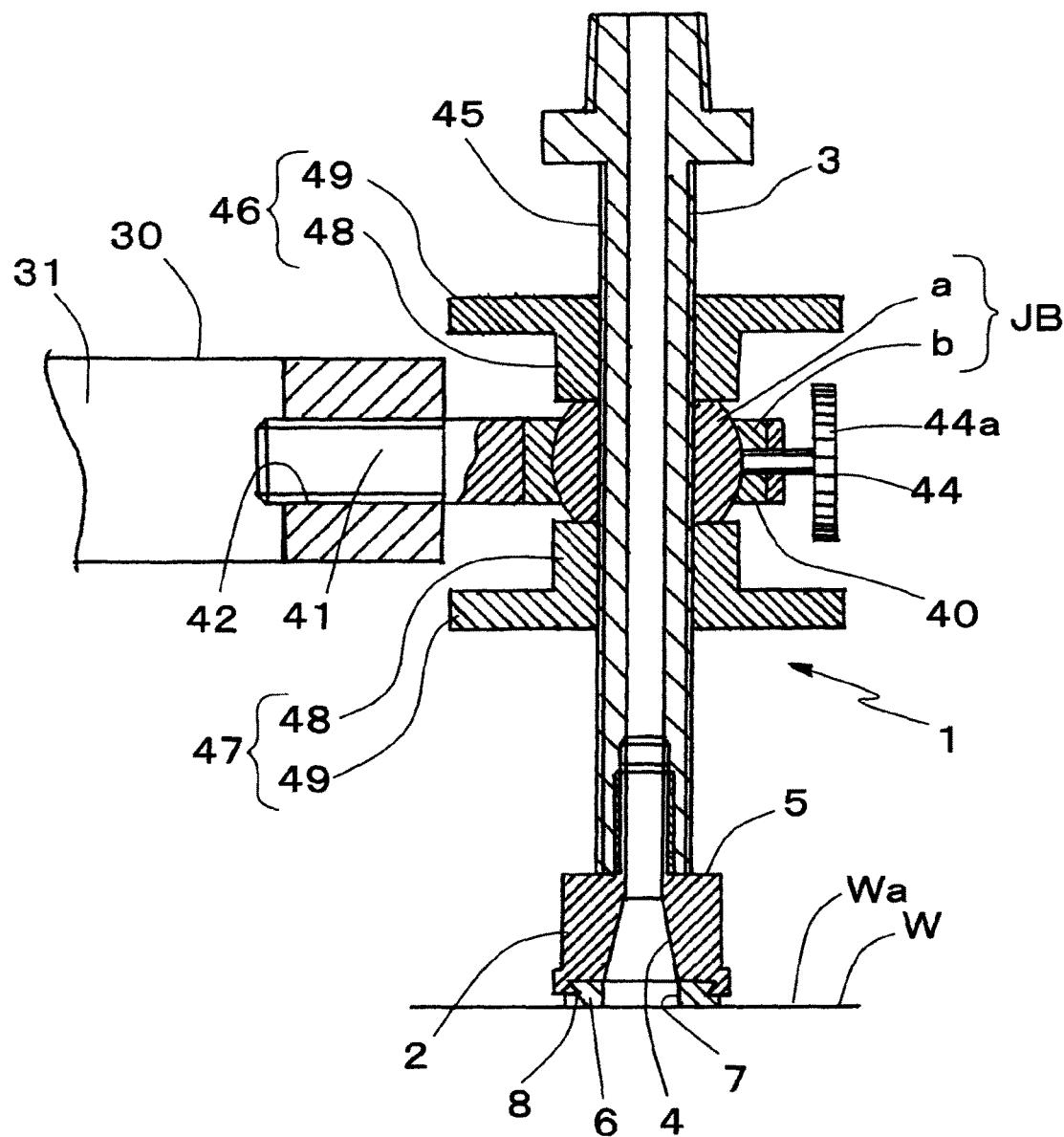
FIG. 5 shows another cross-sectional view of essential parts of the device for repairing a crack in a wall according to an embodiment of the present invention.

As shown in FIGS. 1, 2 and 5, the injection nozzle 1 comprises a nozzle part 2 and an inflow pipe 3. The front end of the nozzle part 2 is arranged in the crack K of the wall surface Wa, and injects filler in the crack K. The inflow pipe 3 is connected to the nozzle part 2, and flows filler in the crack K. As shown in FIG. 5, the nozzle part 2 comprises a nozzle main body 5 that is connected to the inflow pipe 3 and has a discharge port 4 in a flared shape that gradually expands and a resin-made cushioning member 6 that is provided on the edge of the opening of the nozzle main body 5 and elastically contacts the wall surface Wa. As shown in FIG. 5, the cushioning member 6 is made of an elastic resin having high adhesiveness such as silicone resin, and formed in a disk shape having a hole 7 communicating with the discharge port 4 in the center. On the periphery of the opening edge portion of the nozzle main body 5, a ring-shaped engaging projection 8 which bites the outer periphery of the cushioning member 6 and engages with the cushioning member 6 is formed.

As shown in FIGS. 1 and 2, to the inflow pipe 3 of the injection nozzle 1, a supply pipe 10 for supplying filler to the inflow pipe 3 is connected. The supply pipe 10 has a connection port 11 connected to the inflow pipe 3, a first branched pipe 12, a second branched pipe 13 and a third branched pipe 14 that are intercommunicated with the connection port 11. The branched pipes 12, 13 and 14 are branched in three directions. Each of the branched pipes 12, 13 and 14 has a manual opening and closing valve 15 that opens and closes the branched pipes 12, 13 and 14. For example, to the first branched pipe 12, a supply channel (not shown) that supplies a pre-treatment filler that is impregnated in the concrete of the crack K to allow the concrete to be dense. In the second branched pipe 13, as another filler, a supply channel (not shown) that supplies a main filler that blocks the crack K is connected. The remaining third branched pipe 14 is used for cleaning with air. In each of the supply channels respectively connected to the first branched pipe 12 and the second branched pipe 13, an injection pump that supplies filler individually is provided. The injection pump 16 for the second branched pipe 12 is shown in FIG. 2.

The adsorption disk 20 is fixed to the supporting shaft 22 in which a suction passage 21 for sucking air is formed, and is adsorbed to the wall surface Wa by suction of air through the suction passage 21. As shown in FIG. 2, the adsorption disk 20 comprises a disk-like adsorption main body 23 of which the central part is fixed to the supporting shaft 22. The adsorption main body 23 is formed of a hard transparent resin such as an acrylic resin, for example.

On the lower surface of the adsorption main body 23, a ring-like groove 25 with the central part of the adsorption main body 23 being as the center is formed. The annular groove 25 is fitted with the ring-shaped packing 24 and adhered with adhesive. The ring-like packing 24 is protruded from the lower surface of the adsorption main body 23, and elastically contacts the wall surface Wa. The ring-like packing 24 comprises a first member 24a composed of an elastic resin on the base end part side, and a second member 24b that is laminated on the first member 24a and is in contact with the wall surface Wa and is formed of closely contactable elastic resin, such as a silicone resin.

A recess 26 that connects with the suction passage 21 of the supporting shaft 22 and faces the wall surface Wa is formed inside of the ring-like packing 24 on the lower surfaces of the adsorption main body 23. A vacuum pump 27 (see FIG. 2) is connected to the suction passage 21.

The arm 30 is made of metal such as stainless steel and has a rod-like shape having a rectangular cross-sectional shape. In order to reduce the weight, elliptical through hole 31 are formed at two locations in the front and back along the axial direction of the arm 30. As shown in FIG. 2, when the arm 30 is viewed from the side, the distance L1 between the central axis of the supporting shaft 22 and the central axis of the injection nozzle 1 is shorter than the distance L2 between the central axis of the supporting shaft 22 and the central axis of the contact member 50. Preferably, 2L1≤L2. In the present embodiment, 2L1=L2.

Figure 4:
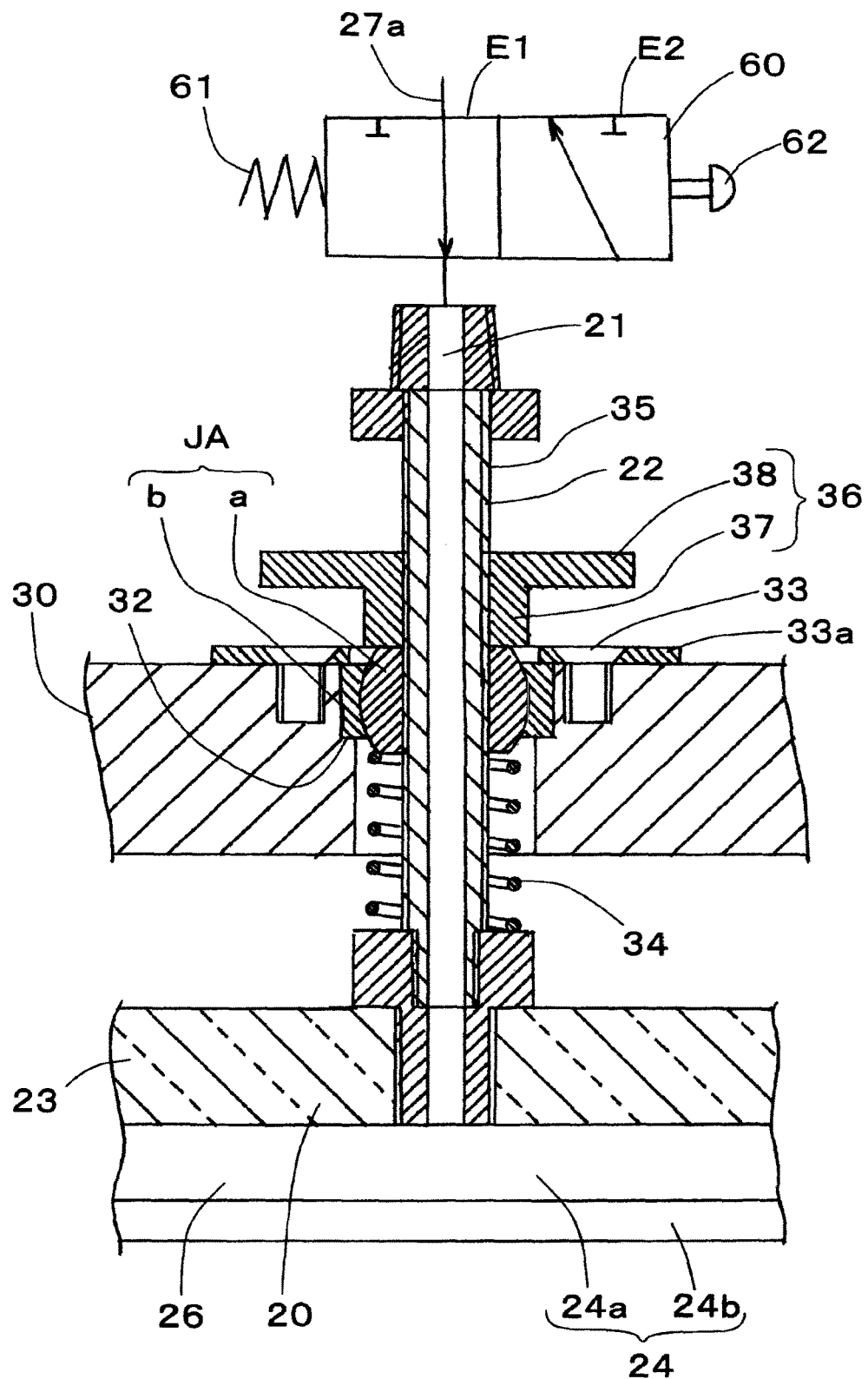
FIG. 4 shows a cross-sectional view of essential parts of the device for repairing a crack in a wall according to an embodiment of the present invention.

The first universal joint JA comprises a spherical rotating member a having a through hole through which the supporting shaft 22 is inserted and a ring-like retention ring b that rotatably retains the spherical rotating member a. As shown in FIG. 4, the retention ring b is engaged with an insertion recess part 32 that is formed in the midway in the axial direction of the arm 30, and is fixed by a retaining plate 33a attached to the arm 30 by a pair of countersunk bolts 33 so as not to come off. Between the upper surface of the adsorption disk 20 and the retention ring b of the first universal joint JA on the lower surface side of the arm 30, a pressing coil spring 34 is loosely fitted to the supporting shaft 22 in a compressed state.

A male screw 35 is formed on the outer periphery of the supporting shaft 22. On the upper surface side of the arm 30, there is provided a regulation nut part 36 that is engaged with the male screw of the supporting shaft 22 and regulates the upward movement of the arm 30. As shown in FIG. 4, the regulation nut part 36 includes a nut main body 37 having a female screw to be screwed with the male screw 35 of the supporting shaft 22, and an operation flange 38 integrally formed with the nut main body 37 on the outer periphery of the nut main body 37. The operation flange 38 is grasped and rotates the nut main body 37 by manual operation. The operation flange 38 has a circular outer periphery, and a non-slip knurling is formed on the outer peripheral surface.

The inflow pipe 3 of the injection nozzle 1 is supported at the front end part of the arm 30 through the second universal joint JB. The second universal joint JB includes a spherical rotating member a having a through hole through which the inflow pipe 3 is inserted and a retention ring b in a ring shape for rotatably retaining the rotating member a. The retention ring b is held by a holder 40 constituting the front end part of the arm 30. The holder 40 has a projecting male screw part 41. The male screw part 41 of the holder 40 is engaged with the female screw part 42 formed in the front end part of the arm 30 and having an axial in the axial direction of the arm 30. The length of a protruded part of the holder 40 can be adjusted by the degree of threading of the male screw part 41 to the female screw part 42. A lock bolt 44 is provided on the holder 40 to lock the rotation of the rotating member a. A bolt head 44a of the lock bolt 44 is formed in a disk shape so that it can be rotated by manual operation. On the outer peripheral surface of the bolt 44a, a non-slip knurling is formed.

In addition, a male screw 45 is formed on the outer periphery of the inflow pipe 3. A pair of lock nut parts 46 and 47 are provided on the upper surface side and the lower surface side of the arm 30. Each of the pair of lock nut parts 46 and 47 is engaged with the male screw 45 of the inflow pipe 3 to lock the inflow pipe 3. As shown in FIG. 5, each of the pair of lock nut parts 46 and 47 has a nut main body 48 having a female screw screwed with the male screw 45 of the inflow pipe 3, and an operation flange 49, integrally formed with the nut main body 48, on the outer periphery of the nut main body 48. The operation flange 49 is grasped and rotates the nut main body 48 by manual operation. The outer periphery of the operation flange 49 is formed in a circular shape. On the outer peripheral surface of the operation flange 49, a non-slip knurling is formed.

Figure 3:
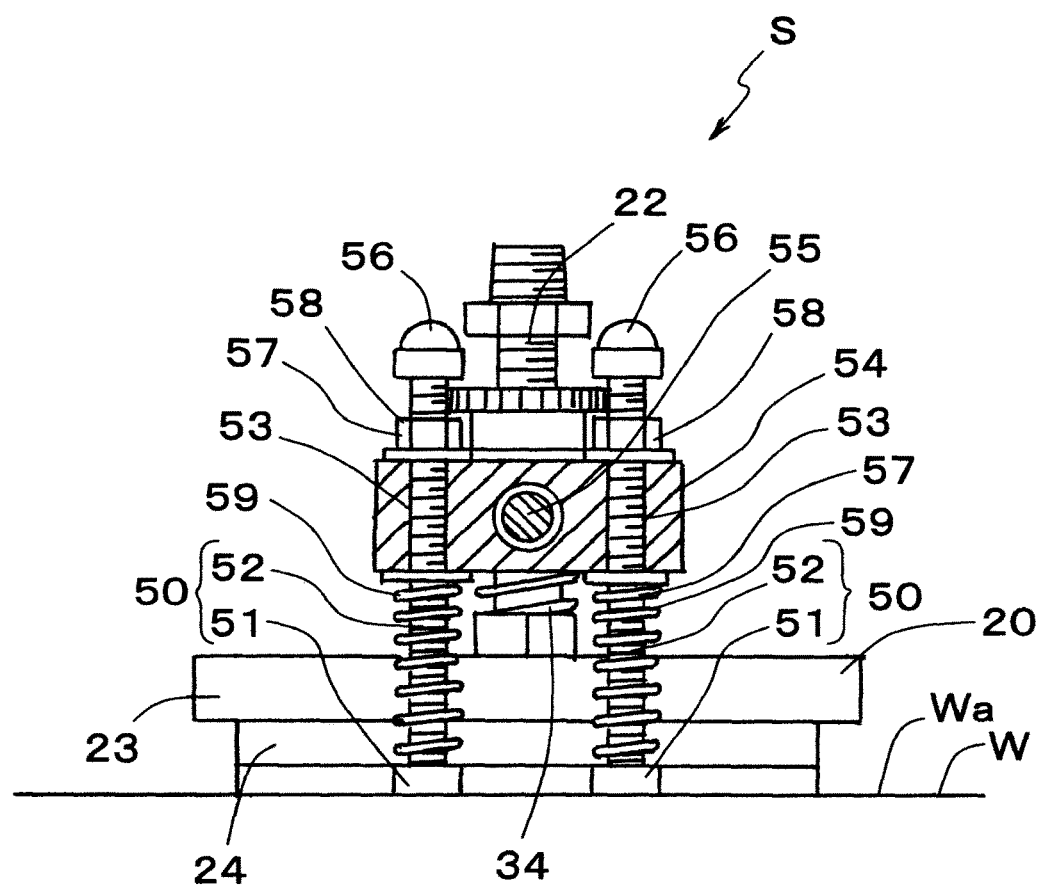
FIG. 3 shows a cross-sectional view taken along the line A-A in FIG. 2.

A plurality of contact members (a pair of contact members in the present embodiment) 50 are arranged at both sides of the axis P of the arm 30 in a direction orthogonal to the direction of the axis P. More specifically, as shown in FIGS. 2 and 3, each of the pair of contact members 50 is composed of a shaft body that is provided at the rear end part of the arm 30 so as to be able to move up and down. Each of the contact members 50 has a contact head 51 that contacts the wall surface Wa and a male screw rod 52 that extends from the contact head 51 and has a diameter smaller than that of the contact head 51. At the rear end part of the arm 30, a rear end member 54 is fixed by a bolt 55. In the rear end member 54, a plurality of insertion holes 53 (one pair in the embodiment) is formed through which the male screw rod 52 of each contact member 50 is inserted. A cap nut 56 is screwed to the front end of the male screw rod 52.

Each contact member 50 is comprises a lock mechanism 57 that locks the corresponding contact member 50 at a desired position. The lock mechanism 57 includes a pressing coil spring 59 loosely fitted to the male screw rod 52 in a compressed state between the lower surface of the rear end member 54 and the contact head 51, and a lock nut 58 screwed with the male screw rod 52 on the upper surface side of the rear end member 54. Since the lock mechanism 57 has a simple mechanism in which the shaft body as the contact member 50 that is inserted through the insertion hole 53 is moved up and down relative to the insertion hole 53, and locked by the lock nut 58, a position of the contact member 50 can be easily adjusted.

Further, as shown in FIGS. 1, 2 and 4, a suction pipe 27a from the vacuum pump 27 is connected to the suction passage 21 of the supporting shaft 22. Between the upper end of the supporting shaft 22 and the suction pipe 27a, a switching valve 60 is attached. The switching valve 60 is a 3-port 2-position direction switching valve (normally open, push button spring return). The switching valve 60 includes a spring 61 for urging the switching valve 60 to the normal position E1 to validate the suction of the vacuum pump 27, and a push button 62 for positioning, against an urging force of the spring 61, the switching valve 60 at an operation position E2 at which the suction passage 27 is opened to the atmosphere to invalidate the suction by the vacuum pump 27.

By using the device S for repairing a crack in the wall W according to the present embodiment, filler is filled in the crack K of the wall surface Wa. First, in advance, the following positions are adjusted: a position at which the upward movement of the arm 30 relative to the supporting shaft 22 is regulated, a position at which the nozzle part 2 of the injection nozzle 1 is protruded relative to the second universal joint JB, and a position of the contact member 50 capable of moving up and down relative to the rear end member 54.

When adjusting the regulation position of the upward movement of the arm 30 with respect to the supporting shaft 22, the regulation nut part 36 is moved to a desired position and fixed by tightening. As a result, upward movement of the arm 30 is regulated, and the adsorption disk 20 is always urged against the wall surface Wa by the pressing coil spring 34. Therefore, the adsorption disk 20 is certainly fitted securely on the wall surface Wa without rattling. In particular, it is effective in attracting the adsorption disk 20 to a ceiling. By rotating the nut main body 37 by manual operation of the operation flange 8, the urging force of the pressing coil spring 34 is easily adjusted and the degree of fitting of the adsorption disk 20 to the wall surface Wa, and the degree of pressing of the injection nozzle 1 and the contact member 50 against the wall surface Wa are easily and appropriately adjusted, whereby operability is improved.

When adjusting the protrusion position of the nozzle part 2 of the injection nozzle 1 relative to the second universal joint JB, the injection nozzle 1 is moved up and down to a desired position, and a pair of lock nut parts 46 and 47 are tightened against the second universal joint JB, whereby the injection nozzle 1 is fixed. When a pair of lock nut parts 46 and 47 are tightened, the inflow pipe 3 is fixed, and the injection nozzle 1 can be reliably positioned. In this case, since the nut main body 48 can be rotated by manual operation of the operation flange 49, operability is improved.

When adjusting the position of the contact member 50 relative to the rear end member 54, each of the pair of contact members 50 is allowed to move up and down relative to the rear end member 54 of the arm 30, and is locked at a desired position. The contact member 50 is locked at the upper surface side of the rear end member 54 by tightening the lock nut 58 of the lock mechanism 57 against to the rear end member 54. Since each of contact members 50 can be locked at a desired position, the mutual balance of the pair of contact members 50 is adjusted, whereby the supporting of the arm 30 can be stabilized.

When using the device S for repairing a crack thus adjusted, firstly, with the vacuum pump 27 being driven, a push button 62 of a switching valve 60 is pushed to allow the switching valve 60 to move to the working position E 2. As a result, suction by the vacuum pump 27 is invalidated. Subsequently, in accordance with the condition of the crack K of the wall surface Wa to be repaired, an optimum position of the injection nozzle 1 is selected, and an adsorption disk 20 is positioned at an appropriate position in the vicinity of the selected position. Subsequently, the arm 30 is rotated about the vertical axis in a midway of the longitudinal direction of the arm 30, whereby the front end of the nozzle part 2 of the injection nozzle 1 is positioned at a position of the crack K of the wall surface Wa. Then, the push button 62 is released, and the switching valve 60 is returned to the normal position E1. As a result, suction by the vacuum pump 27 is validated, whereby the adsorption disk 20 is fixed to the wall surface Wa.

In the second universal joint JB, the rotating member a is locked by tightening the rock bolt 44 timely. Since the adsorption disk 20 is always urged against the wall surface Wa by the pressing coil spring 34, the adsorption disk 20 can be fitted to the wall surface Wa easily without rattling. This is particularly effective in adsorbing the adsorption disk to the ceiling. Meanwhile, the adsorption disk 20 may be adsorbed to the wall surface Wa with the suction being validated by releasing the push button 62 during movement of the device S for repairing a crack.

In order to supply filler of a necessary kind, the opening and closing valves 15 provided at each branched pipe 12, 13 and 14 are opened or closed before or after fitting the device S for repairing a crack to the wall surface Wa. In this state, the injection pump (e.g. an injection pump 16 in FIG. 2) is driven. As a result, filler is discharged from the nozzle part 2 of the injection nozzle 1, and filler is filled in the crack K of the wall surface Wa. Since the discharge port 4 of the nozzle part 2 of the injection nozzle 1 has a flared shape that gradually expands and the opening of the discharge port 4 is wider, it is easily possible to position the discharge port 4 on the line of the crack K easily, whereby filler is reliably discharged.

At the time of filling filler, a counter force is generated on the injection nozzle 1 as a reaction of the high pressure transferring of the filler. As a result, moment M around the horizontal axis Q that orthogonally crosses the axial direction P is generated in the arm 30. However, the contact member 50 that is attached to the rear end part of the arm 30 contacts the wall surface Wa, and receives the moment load generated in the arm 30, and hence, the adsorption disk 20 is hardly peeled off from the wall surface Wa. Therefore, even if the filler is transferred from the injection nozzle 1 at a high pressure, the filler is reliably filled in the crack K to be repaired.

Further, since the pair of contact members 50 are arranged in a direction orthogonal to the axial direction P of the arm 30, with the supporting shaft 22 being as the center, the front side of the arm 30 is supported by the injection nozzle 1 and the rear side is supported by the pair of contact members 50. That is, the arm 30 is supported by three points in the front and back. Therefore, even if the arm 30 is forced to rotate around the axis P of the arm 30 through the first universal joint JA, due to the unevenness of the wall surface Wa, the degree of adsorption by the adsorption disk 20, etc., the arm 30 is prevented from rotating in the direction of the axis P of the arm 30 and tilting in the lateral direction. As a result, the injection nozzle 1 is prevented from uplifting or being separated from the crack K, and the filler is reliably filled in the crack K.

Further, in the present embodiment, the length L2 of the arm 30 from the supporting shaft 22 to the contact member 50 is longer than the length L1 of the arm 30 from the supporting shaft 22 to the injection nozzle 1, i.e. 2L1≤L2. Therefore, the momentum load generated in the arm 30 is reliably received by the contact member 50.

In addition, since the contact head 51 of the male screw rod 52 of the contact member 50 elastically contacts the wall surface by the pressing coil spring 59, the contact member 50 follows the wall surface Wa even if the wall surface Wa is not flat and is uneven, whereby stable supporting is realized.

Since the arm 30 itself is pulled towards the adsorption disk 20 by the adsorption force of the adsorption disk 20 against the urging force of the pressing coil spring 34, the injection nozzle 1 and the contact member 50 are pressed preferably against the wall surface Wa. As a result, uplifting or separation of the injection nozzle 1 from the crack K can be prevented, whereby filler is filled in the crack K without fail.

After completion of the filling, the push button 62 of the switching valve 60 is pushed. As a result, the switching valve 60 is positioned at the working position E2, the suction by the vacuum pump 27 is invalidated, and the adsorption of the adsorption disk 20 is released. Then, the device S for repairing a crack is moved to another position, and, in the same manner as mentioned above, the adsorption disk 20 is adsorbed to the wall surface Wa, and filler is filled from the injection nozzle 1. It is possible to conduct adsorption and release of adsorption of the adsorption disk 20 only by pushing and releasing the push button 62 of the switching valve 60. Thus, the operation is significantly easy, and the device S for repairing a crack can be moved smoothly, resulting in a significant improvement in workability. The adsorption disk 20 may be adsorbed to the wall surface Wa with suction being validated by releasing the push button 62 during movement of the device S for repairing a crack.

By using the device S for repairing a crack repeatedly, filler is filled in each crack K one by one. If the device S for repairing a crack is unstable due to the condition of the wall surface Wa, tightening of the regulation nut part 36 may be adjusted or tightening of a pair of lock nut parts 46 and 47 may be adjusted. When adjusting tightening of the regulation nut part 36, since the nut main body 37 is rotated by manual operation of the operation flange 8, operability is improved. Further, when tightening of a pair of lock nut parts 46 and 47 is adjusted, since the nut main body 48 is rotated by manual operation of the operation flange 49, operability is improved. Therefore, fitting conditions of the adsorption disk 20 to the wall surface Wa and pushing conditions of the injection nozzle 1 and the contact member 50 against the wall surface Wa are easily and suitably adjusted, whereby the device S for repairing a crack can be stabilized.

When the adsorption disk 20 is adsorbed to the wall surface Wa by sucking air by the vacuum pump 27, if there is a crack in a part where the adsorption disk 20 is arranged, filler is sucked from the crack to the inside of the adsorption disk. As a result, there may be a fear that the filler reaches the vacuum pump 27 to damage the vacuum pump 27. However, since the adsorption main body 23 of the adsorption disk 20 is made transparent, it is possible to recognize visually the filler sucked from the crack to the inside of the adsorption disk. In this case, by stopping suction and moving the adsorption disk 20 to another place, it is possible to prevent the filler from being sucked by a vacuum pump, whereby safety can be ensured.

Further, a cushioning member 6 provided on the periphery of the opening edge of the nozzle main body 5 is pressed by an engaging projection 8 that bites on the outer periphery and is engaged therewith, it is hardly detached from the nozzle main body 5 even after repeated use, whereby durability is improved.

Since the supply pipe 10 comprising the first branched pipe 12, the second branched pipe 13 and the third branched pipe 14 is connected to the inflow pipe 3 of the injection nozzle 1, it is possible to switch the type of the filler and filled the filler. For example, when a certain type of filler is injected, the opening and closing valve 15 of the first branched pipe 12 is open, and the other is closed. Further, when another type of filler is injected, the opening and closing valve of the third branched pipe 14 is open, and air is supplied thereto to clean the passage. Subsequently, the opening and closing valve of the first branched pipe 12 is closed, the third branched pipe 14 is open to fill another filler. When a certain type of filler is filled, cleaning is conducted in the same manner as mentioned above, and the same procedures as mentioned above are conducted. As mentioned above, two types of filler are injected while appropriately switching, and as a result, two types of filler each are injected with high operation efficiency.

FIGS. 6 to 10 each show the device S for repairing a crack according to another embodiment of the present invention. As in the case with that mentioned above, the device S for repairing a crack comprises: as a basic structure, an injection nozzle 1 for injecting filler into a crack K in the wall W; an adsorption disk 20 that can be adsorbed to the wall surface Wa by suction of air and can be detached from the wall surface Wa by release of suction; the arm 30 that is supported through the first universal joint JA in the midst of the arm 30 by the supporting shaft 22 that supports the adsorption disk 20 and supports, at its front end, the injection nozzle 1 through the second universal joint JB; and the contact member 50 that is provided at the rear end part of the arm 30 and the front end thereof contacts the wall surface Wa the receives moment load generated in the arm 30 when filling filler by the injection nozzle 1.

Figure 6:
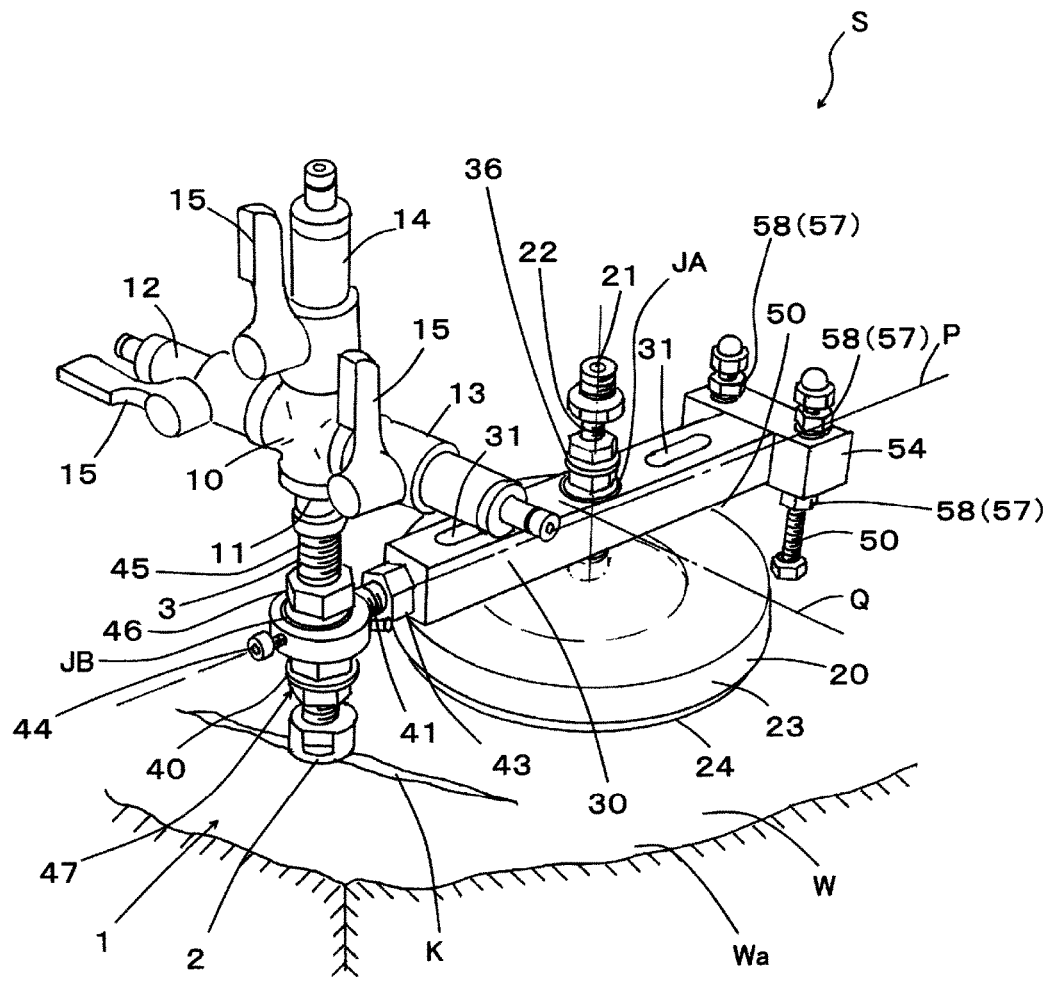
FIG. 6 shows a perspective view of the device for repairing a crack in a wall according to an embodiment of the present invention.
Figure 7:
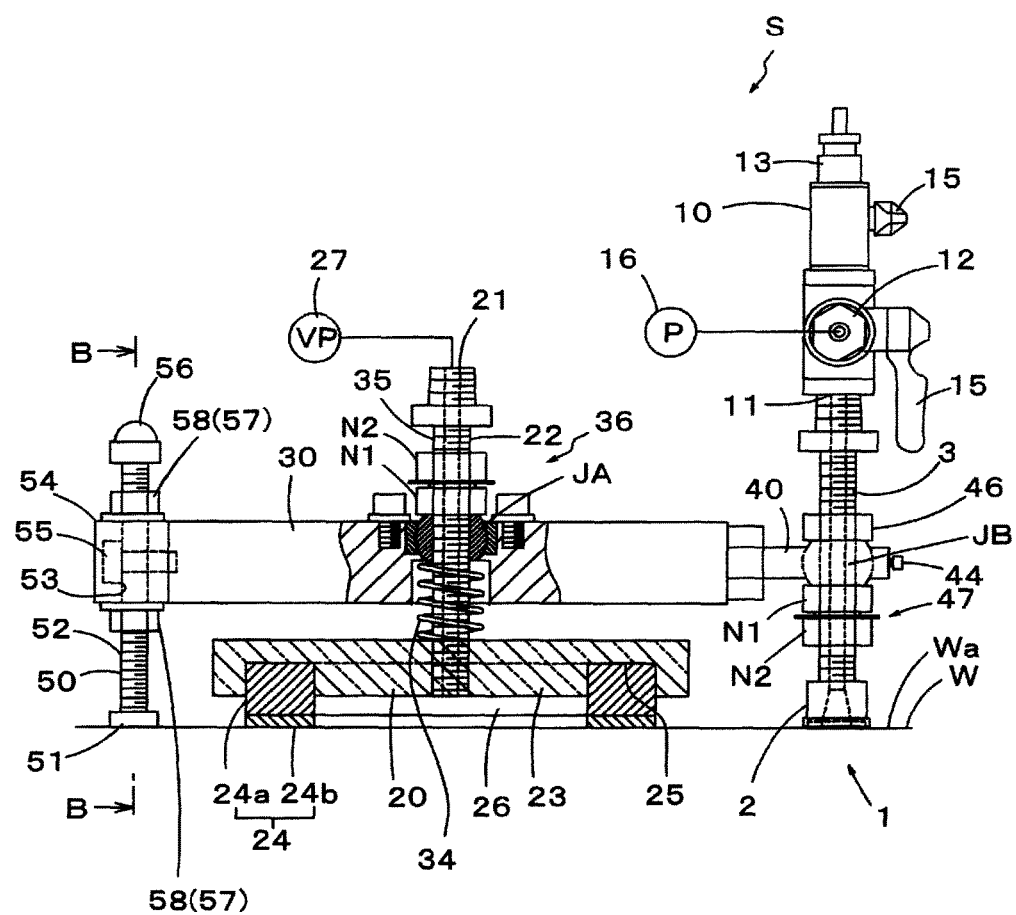
FIG. 7 shows a partially cut-away side view of the device for repairing a crack in a wall according to an embodiment of the present invention.
Figure 10:
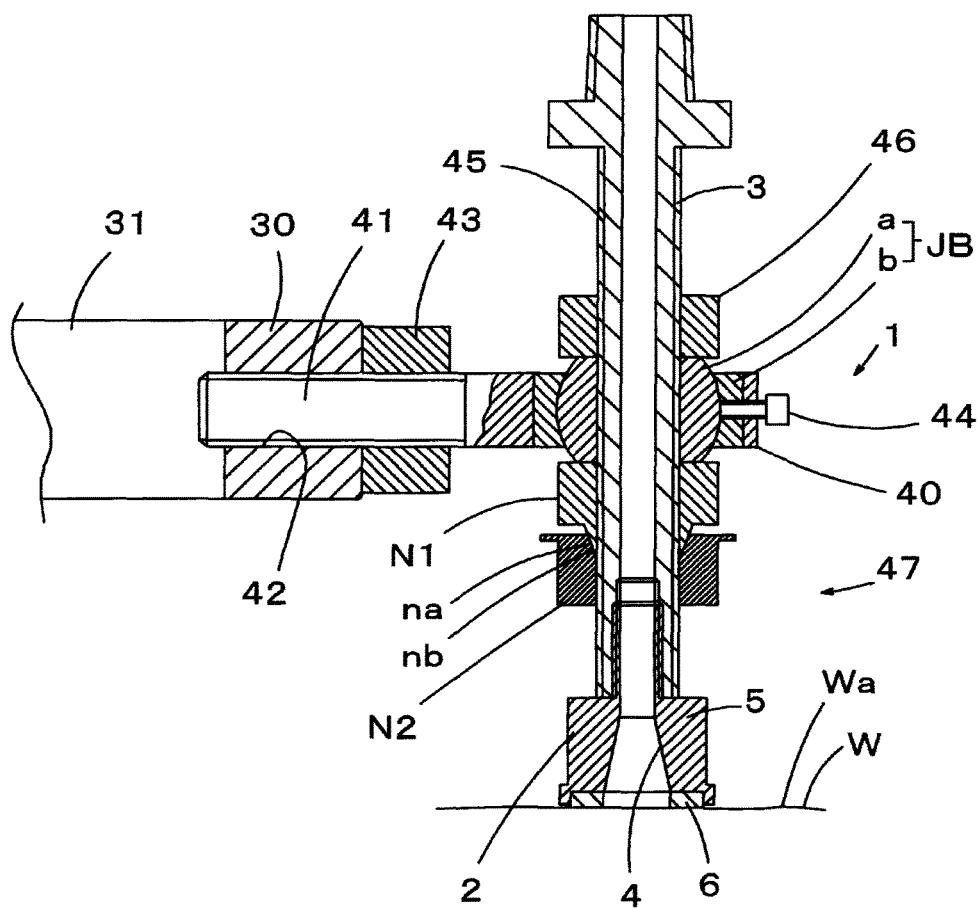
FIG. 10 shows a cross-sectional view of essential parts of the device for repairing a crack in a wall according to another embodiment of the present invention.
Figure 11:
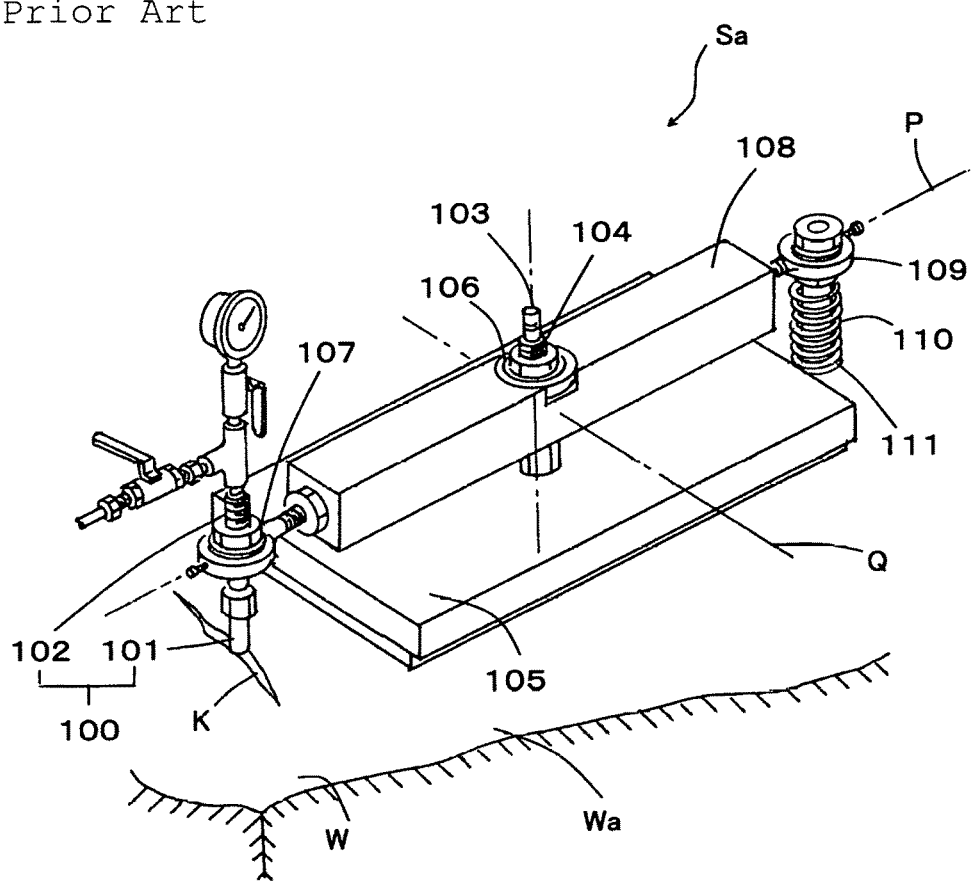
FIG. 11 shows a perspective view of one example of the conventional device for repairing a crack in a wall.

As shown in FIGS. 6, 7 and 10, the injection nozzle 1 comprises the nozzle part 2, the front end thereof being positioned at the crack K for injecting filler in the crack K and the inflow pipe 3 that is connected to the nozzle part 2 and flows the filler into the nozzle part 2.

As shown in FIG. 10, the nozzle part 2 comprises the nozzle main body 5 and the cushioning member 6. The nozzle main body 5 has the discharge port 4 in a flared shape that gradually expands and is connected to the inflow pipe 3. The cushioning member 6 is provided on the edge part of the opening of the nozzle main body 5 and elastically contacts the wall surface Wa. The cushioning member 6 is made of an elastic resin having a high adhesiveness, such as a silicone resin.

As shown in FIGS. 6 and 7, the supply pipe 10 for supplying filler to the inflow pipe 3 is connected to the inflow pipe 3 of the injection nozzle 1. This supply pipe 10 comprises a connection port 11 to be connected to the inflow pipe 3, and the first branched pipe 12, the second branched pipe 13 and the third branched pipe 14 that are intercommunicated with the connection port 11 and branched into three directions. Each branched pipe 12, 13 and 14 is provided with a manually-operated opening and closing valve 15 that opens and closes the branched pipes 12, 13 and 14. To the first branched pipe 12, a supply passage (not shown) is connected through which a pretreatment filler is supplied as a certain type of filler, for example, to be impregnated in the concrete of the crack K to densify the concrete. To the second branched pipe 13, a supply passage (not shown) is connected through which a main filler is supplied as another filler to block the crack K. The remaining third branched pipe 14 is used for cleaning with air. Each of the first branched pipe 12 and the second branched pipe 13 is provided with an injection pump that supplies filler individually. FIG. 7 shows an injection pump 16 for the second branched pipe 12.

The adsorption disk 20 is fixed to the supporting shaft 22 in which the suction passage 21 for sucking air is formed, and is adsorbed to the wall surface Wa by sucking of air through the suction passage 21. As shown in FIG. 7, the adsorption disk 20 comprises the disk-like adsorption main body 23 of which the central part is fixed to the supporting shaft 22. The adsorption main boy 23 is formed of hard, transparent resin such as an acrylic resin.

On the lower surface of the adsorption main body 23, a ring-like groove 25 is formed around the central part of the adsorption main body 23. In the annular groove 25, a ring-like packing 24 is engaged and adhered with an adhesive. The ring-like packing 24 protrudes from the lower surface of the adsorption main body 23 and elastically contacts the wall surface Wa. The ring-like packing 24 comprises a first member 24a that is formed of an elastic resin and is positioned on the base end side and a second member 24b that is formed of a highly adhesive elastic resin such as a silicon resin and is stacked on the first member 24a and contacts the wall surface Wa.

On the lower surfaces of the adsorption main body 23, a recess 26 communicating with the suction passage 21 of the supporting shaft 22 and opposing the wall surface Wa is formed on the inside of the ring-like packing 24. A vacuum pump 27 (see FIG. 7) is connected to the suction passage 21.

The arm 30 is made of a metal such as stainless steel, and has a rod-like shape having a rectangular cross sectional shape. In order to reduce the weight, an elliptical insertion hole 31 is formed at two locations in the front and back along the axial direction in the arm 30.

The first universal joint JA comprises a spherical rotating member a having an insertion hole through which the supporting shaft 22 is inserted and a ring-like retention ring b that rotatably retains the rotating member a. The retention ring b is engaged with the insertion recess 5 formed in the middle part of the arm 30 and fixed by a pair of bolts 33 on the upper surface.

Between the upper surface of the adsorption disk 20 and the retention ring b of the first universal joint JA on the lower side of the arm 30, a pressing coil spring 34 is loosely fitted to the supporting shaft 22 in a compressed state.

Figure 9:
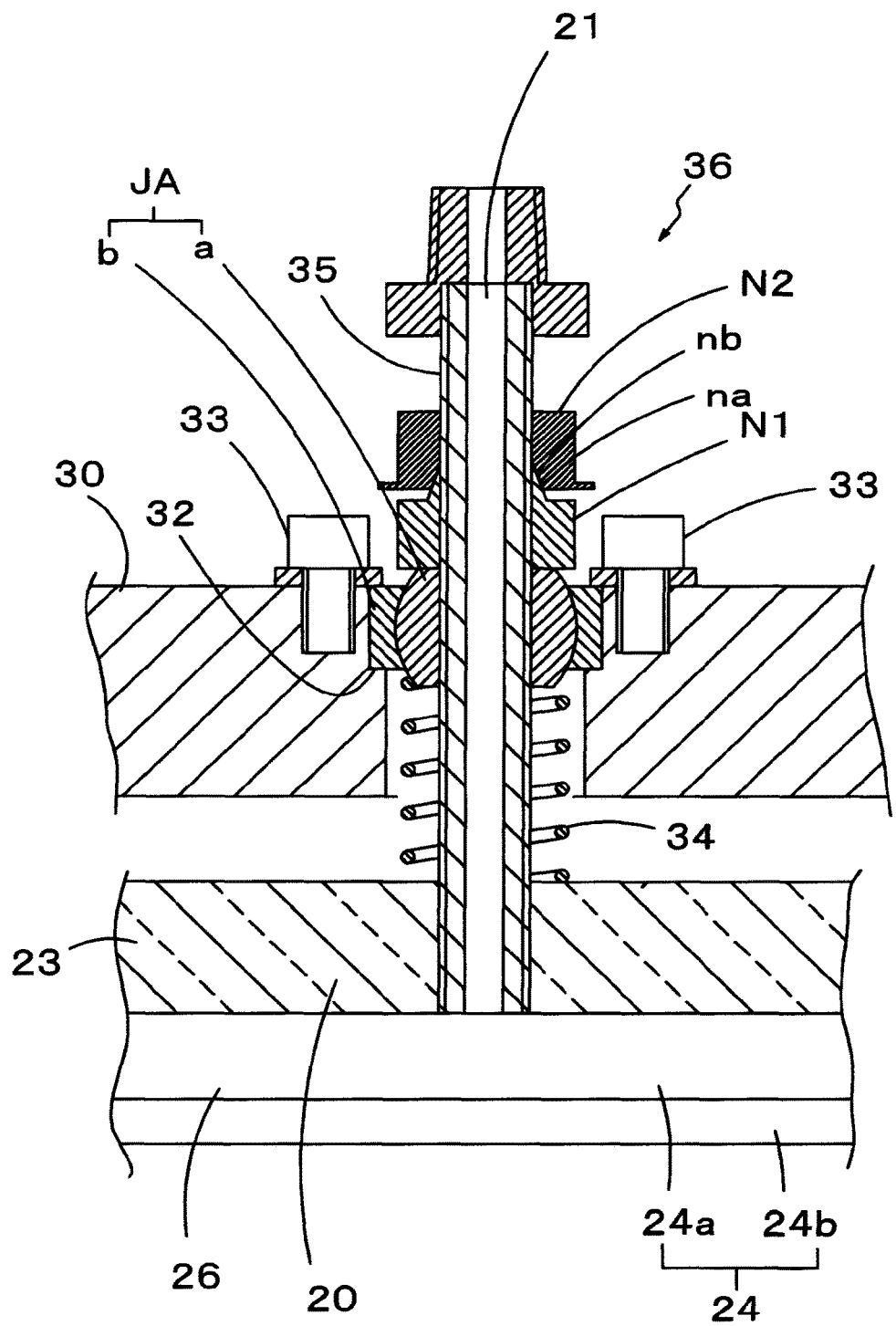
FIG. 9 shows a cross-sectional view of essential parts of the device for repairing a crack in a wall according to another embodiment of the present invention.

On the outer periphery of the supporting shaft 22, a male screw 35 is formed. On the upper surface side of the arm 30, the regulation nut part 36 that is screwed with the male screw of the supporting shaft 22 is provided. The regulation nut part 36 regulates the upward movement of the arm 30. As shown in FIG. 9, the regulation nut part 36 is formed of a pair of a first nut N1 and a second nut N2 provided on one end side of the first nut N1.

On the inner periphery of the first nut N1, a female screw that comprises the male screw 35 of the supporting shaft 22 is formed. The first nut N1 has, on part of its one end side, a tapered pipe na extending along the inner periphery on which the female screw is formed. The tapered pipe na has a tapered shape of which the outer periphery is narrowed from the base end towards the front end.

On the inner periphery of the second nut N2, a female screw that is screwed with the male screw 35 of the supporting shaft 22 is formed. The first nut N2 has, on part of its one end, a tapered recess nb. The tapered recess nb has a tapered surface that connects the outer periphery of the tapered pipe na of the first nut N1.

The arm 30 supports the inflow pipe 3 of the injection nozzle 1 through the second universal joint JB at the front end of the arm 30. The second universal joint JB includes a spherical rotating member a having a through hole through which the inflow pipe 3 is inserted, and a ring-shaped retention ring b that rotatably retains the rotating member a. The holder 40 has a protruded male screw part 41. The male screw part 41 is screwed with the female screw part 42 that is formed at the front end part of the arm 30 and has an axial in the axial direction of the arm 30. According to the degree of screwing of the male screw part 41 relative to the female screw part 42, the length of a protruded part of the male screw part 41 can be adjusted. The lock nut 43 is screwed with the male screw part 42 to lock the holder 40 at a desired protruded position. The holder 40 has a lock bolt 44 that locks the rotation of a rotating member a.

A male screw 45 is formed on the outer periphery of the inflow pipe 3. A pair of lock nut parts 46 and 47 that is screwed with the male screw 45 of the inflow pipe 3 to lock the inflow pipe 3 are provided on the upper surface side and the lower surface side of the arm 30.

As shown in FIG. 10, the lock nut part 46 on the upper side comprises one nut. On the other hand, the lock nut part 47 on the lower surface side comprises a first nut N1 and a second nut N2 provided on one end side of the first nut N1.

On the inner periphery of the first nut N1, a female screw that is screwed with the male screw 45 of the inflow pipe 3 is formed. The first nut N1 has, on part of its one end side, a tapered pipe na, that extends along the inner periphery on which the female screw is formed and has an outer periphery that is narrowed from the base end towards the front end.

On the inner periphery of the second nut N2, a male screw that is screwed with the male screw 45 of the inflow pipe 3 is formed. The second nut N2 has, on part of its one end, a tapered recess nb. The tapered recess nb has a tapered surface that connects the outer periphery of the tapered pipe na of the first nut N1. By tightening the second nut N2 towards the first nut N1, the tapered pipe na is reduced in diameter and is pressed against the male screw 45 of the inflow pipe 3.

Figure 8:
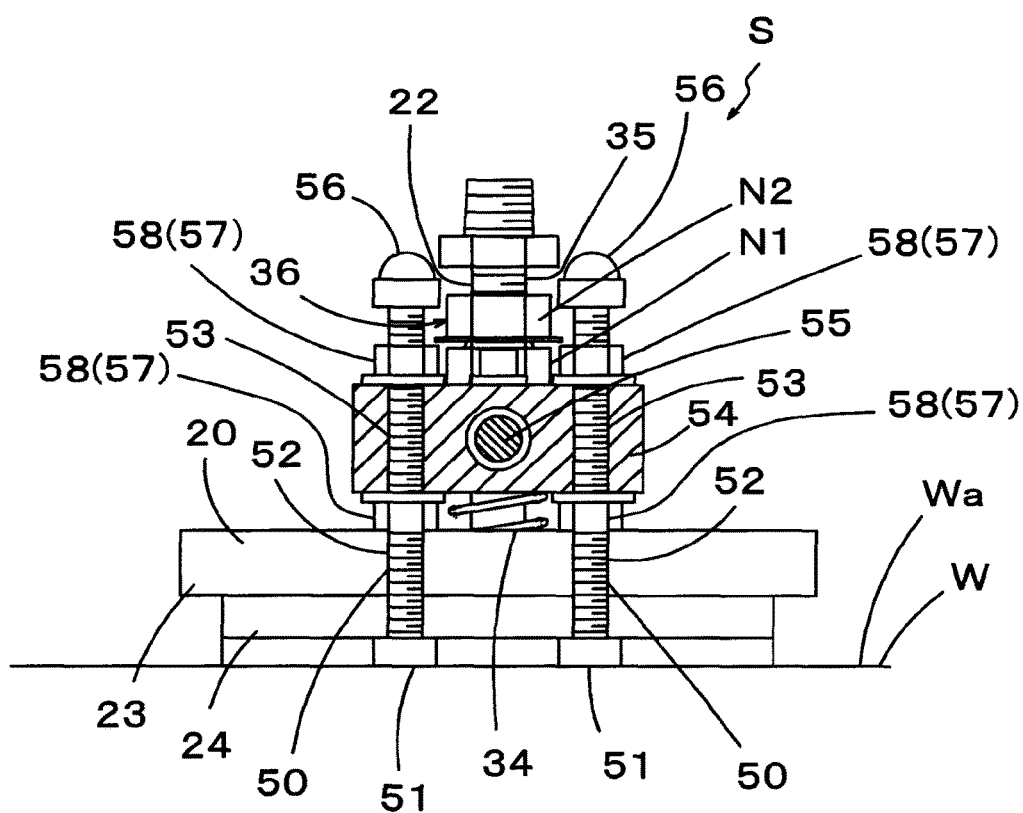
FIG. 8 shows a cross-sectional view taken along line B-B in FIG. 7.

A plurality of contact members (a pair of contact members in the embodiment) 50 are arranged at both sides of the axis P of the arm 30 in a direction orthogonal to the direction of the axis P. As shown in FIGS. 7 and 8, each contact member 50 is composed of a shaft body provided at the rear end part of the arm 30 so as to be able to move up and down. Each of the contact members 50 has a contact head 51 that contacts the wall surface Wa, and a male screw rod 52 extending from the contact head 51 and having a smaller diameter than that of the contact head 51. At the rear end part of the arm 30, a rear end member 54 is fixed by a bolt 55. In the rear end member 54, a plurality of insertion holes 53 (one pair in the embodiment) is formed through which the male screw rod 52 of each contact member 50 is inserted. A cap nut 56 is screwed to the front end of the male screw rod 52.

Each of the pair of contact members 50 includes a lock mechanism 57 that locks each of the plurality of contact members 50 at a desired position. The lock mechanism 57 has a lock nut 58 that is screwed with the male screw rod 52 on the lower surface side and the upper surface side of the rear end member 54. Since the lock mechanism 57 has a simple mechanism allowing the shaft body as the contact member 50 to be moved up and down with respect to the insertion hole 53 and to be locked with the lock nut 58, the shaft body can be easily adjusted.

By using the device S for repairing a crack in the wall W according to the present embodiment, filler is filled in the crack K of the wall surface Wa. First, in advance, the following positions are adjusted: a position at which the upward movement of the arm 30 relative to the supporting shaft 22 is regulated, a position at which the nozzle part 2 of the injection nozzle 1 is protruded relative to the second universal joint JB, and a position of the contact member 50 capable of moving up and down relative to the rear end member 54.

When adjusting the regulation position of the upward movement of the arm 30 relative to the supporting shaft 22, the regulation nut part 36 is moved to a desired position, and fixed by tightening the second nut N2 on the first nut N1. As a result, by the tapered recess nb of the second nut N2, the tapered pipe na of the first nut N1 is pressed and reduced in diameter. As a result, the female screw of the first nut N1 is pressed against the male screw 35 of the supporting shaft 22 and fixed. Therefore, the regulation nut part 36 is hardly moved relative to the supporting shaft 22, whereby upward movement of the arm 30 is reliably regulated.

When adjusting the protrusion position of the nozzle part 2 of the injection nozzle 1 with respect to the second universal joint JB, the injection nozzle 1 is moved up and down to a desired position, and the pair of lock nut parts 46, 47 are fastened against the second universal joint JB to fix the injection nozzle 1. In the lock nut part 47 at the lower surface side, the second nut N2 is tightened on the first nut N1. As a result, the tapered pipe na of the first nut N1 is pressed by the tapered recess nb of the second nut N2 to reduce the diameter thereof. As a result, the female screw of the first nut N1 is pressed against the male screw 45 of the inflow pipe 3, and is fixed. As a result, the lock nut parts 46 and 47 cannot be moved easily relative to the supporting shaft 22, whereby the injection nozzle 1 is positioned reliably.

When adjusting the position of the contact member 50 with respect to the rear end member 54, the pair of contact members 50 are moved up and down with respect to the rear end member 54, and are locked at a desired position with the lock nut 58 of the lock mechanism 57. The lock nuts 58 are tightened against the rear end member 54 on each of the lower surface side and the upper side surface of the rear end member 54. By locking each contact member 50 at the desired position to adjust the mutual balance of the pair of contact members 50, the support of the arm 30 is stabilized.

When using the device S for repairing a crack thus adjusted, firstly, the optimum position of the injection nozzle 1 is selected according to the state of the crack K of the wall surface Wa to be repaired. Subsequently, the adsorption disk 20 is positioned at an appropriate position where no crack K is present in the vicinity of this position. Next, the arm 30 is rotated about the vertical axis at the intermediate portion thereof, and the front end of the nozzle part 2 of the injection nozzle 1 is positioned at the position of the crack K on the wall surface Wa. Subsequently, the vacuum pump 27 is driven to suck the air in the recess 26 of the adsorption disk 20, and the adsorption disk 20 is fixed by being attracted to the wall surface Wa.

In the second universal joint JB, the lock bolt 44 is timely tightened to lock the rotating member a. Since the adsorption disk 20 is always urged to the wall surface Wa by the pressing coil spring 34, the adsorption disk 20 can be fitted to the wall surface Wa without rattling. In particular, it is effective when adsorbing the adsorption disk to the ceiling.

Also, before or after fitting on the wall surface Wa of the device S for repairing a crack, the opening and closing valve 15 provided on the branched pipes 12, 13 and 14 of the supply pipe 10 is each opened or closed. In this state, the injection pump (e.g. the injection pump 16 in FIG. 7) is driven. As a result, filler is discharged from the nozzle part 2 of the injection nozzle 1, whereby the filler is filled in the crack K in the wall surface Wa. Since the discharge port 4 of the nozzle part 2 of the injection nozzle 1 has a flared shape that gradually expands and the discharge port 4 has a wide opening, the discharge port 4 can be positioned easily on the crack K, whereby filler can be reliably discharged into the crack K.

During filling of the filler, high pressure is applied to the injection nozzle 1 by transferring of the filler, and a reaction force is generated. As a result, moment M around the horizontal axis Q orthogonal to the direction of the axis P thereof is generated in the arm 30. However, since the contact member 50 attached to the rear end part of the arm 30 contacts the wall surface Wa and receives the moment load generated in the arm 30, the adsorption disk 20 is hardly peeled off from the wall surface Wa. Therefore, even if the filler is transferred from the injection nozzle 1 at a high pressure, the filler is filled in the crack K to be repaired reliably.

Since the pair of contact members 50 are arranged in a direction orthogonal to the direction of the axis P of the arm 30, the front side of the arm 30 is supported by the injection nozzle 1 with the support shaft 22 with the intermediate portion being as the center, and the rear side is supported by the pair of contact members 50. That is, the arm 30 is supported by three points in the front and back. Therefore, if the arm is forced to rotate around the axial P of the arm 30 through the first universal joint JA, the arm 30 is prevented from being tilted in the lateral direction due to the rotation of the arm 30 around the axial P. As a result, uplifting or separation of the injection nozzle 1 from the crack K can be prevented, leading to reliable filling of filler.

In addition, since the arm 30 itself is pulled to the side of the adsorption disk 20 against the urging force of the pressing coil spring 34 by the adsorption force of the adsorption disk 20, the injection nozzle 1 and the contact member 50 are favorably pressed against the wall surface Wa. As a result, uplifting or separation of the injection nozzle 1 from the crack K is prevented, leading to reliable filling of filler.

By using the device S for repairing a crack repeatedly, filler is sequentially filled in each crack K. Since the tapered recess nb of the second nut N2 on the regulation nut part 36 tightens the tapered pipe na of the first nut N1 on the supporting shaft, the tapered pipe na is not moved easily relative to the supporting shaft 22. Since the movement of the arm 30 due to the loosening of the regulation nut part 36 is prevented, variations in pressing force of the injection nozzle 1 against the wall surface Wa is suppressed even when used repeatedly, and the filler is reliably filled in the crack K.

Since the tapered recess nb of the second nut N2 tightens the tapered pipe na of the first nut N1 on the inflow pipe 3 of the injection nozzle 1, the lock nut part 47 at the lower side is hardly moved against the inflow pipe 3. Therefore, movement of the injection nozzle 1 due to loosening of the lock nut part 47 is prevented, variations in pressing force of the injection nozzle 1 against the wall surface Wa is suppressed even when used repeatedly, and as a result, filler is filled in the crack K more reliably. When both of the pair of the lock nut parts 46 and 47 are formed of combination of the first nut N1 and the second nut N2, the injection nozzle 1 can be positioned more reliably, thereby preventing rattling.

When the adsorption disk 20 is adsorbed to the wall surface Wa by sucking air by the vacuum pump 27, if there is a crack in a part on the wall surface Wa where the adsorption disk 20 is disposed, filler is sucked from the crack to the inside of the adsorption disk 20. As a result, the filler reaches the vacuum pump 27 from the adsorption disk 20 to damage the vacuum pump 27. However, since the adsorption main body 23 of the adsorption disk 20 is made transparent, filler sucked from the crack into the adsorption disk 20 can be visibly observed. In this case, by stopping the suction and moving the adsorption disk to another place, safety can be ensured.

In the device S for repairing a crack according to the present embodiment, since the supply pipe 10 comprising the first branched pipe 12, the second branched pipe 13 and the third branched pipe 14 is connected to the inflow pipe 3 of the injection nozzle 1, it is possible to switch the type of the filler and filled the filler. For example, when a certain type of filler is injected, the opening and closing valve 15 of the first branched pipe 12 is open, and the other is closed. Further, when another type of filler is injected, the opening and closing valve of the third branched pipe 14 is open, and air is supplied thereto to clean the passage. Subsequently, the opening and closing valve of the first branched pipe 12 is closed, the third branched pipe 14 is closed, and the second branched pie 13 is opened to fill another filler. When a certain type of filler is filled, cleaning is conducted in the same manner as mentioned above, and the same procedures as mentioned above are conducted. As mentioned above, two types of filler are injected while appropriately switching, two types of filler each are injected with high operation efficiency.

In the above-mentioned embodiment, an explanation was made taking an example in which a pair of contact members 50 is provided. The number of the contact member 50 is not limited thereto. Three or more contact members 50 may be provided. The material or shape of each member is not limited to those mentioned above, and may be appropriately modified.

The specification of the Japanese patent applications claiming the priority under the Paris Convention to the invention is incorporated herein by reference in its entirety.

EXPLANATION OF NUMERICAL SYMBOLS

1. Injection nozzle
2. Nozzle part
3. Inflow pipe
4. Discharge port
5. Nozzle main body
6. Cushioning member
7. Hole
8. Engaging projection
10. Supply pipe
11. Connection port
12. First branched pipe
13. Second branched pipe
14. Third branched pipe
15. Opening and closing valve
16. Injection pump
20. Adsorption disk
21. Suction passage
22. Supporting shaft
23. Adsorption main body
24. Packing
26. Recess
27. Vacuum pump
30. Arm
34. Pressing coil spring
35. Male screw
36. Regulation nut part
37. Nut main body
38. Operation flange 40. Holder
44. Lock bolt
44a. Bolt head
45. Male screw
46, 47. Lock nut part
48. Nut main body
49. Operation flange
50. Contact member
51. Contact head
52. Male screw rod
54. Rear end member
57. Lock mechanism
58. Lock nut
59. Pressing coil spring
60. Switching valve
62. push button
S. Device for repairing crack
W. Wall
Wa. Wall surface
K. Crack
P. Axis
JA. First universal joint
JB. Second universal joint
a. Rotating member
b. Retention ring
N1. First nut
na. Tapered pipe
N2. Second nut
nb. Tapered recess

The invention claimed is:

1. A device for repairing a crack in a wall comprising:
an injection nozzle that has a nozzle part, with a front end adapted to be positioned on a crack in a wall and adapted to inject filler into the crack, and an inflow pipe that is connected to the nozzle part and sends filler to the nozzle part,
an adsorption disk that is fixed to a supporting shaft in which a suction passage for sucking air is formed to be adsorbed to a wall surface by sucking air through the suction passage, and to be detached from the wall surface by releasing the suction,
an arm that has a front end part and a rear end part in the axial direction, and is supported by the supporting shaft through a first universal joint and supports an inflow pipe of the injection nozzle in the front end part through a second universal joint, and
a plurality of contact members that are attached to the rear end part of the arm, front ends of the plurality of contact members being adapted to contact the wall surface, and receiving a moment load generated in the arm when injecting the filler into the crack by means of the injection nozzle,
wherein the plurality of contact members are arranged in a direction orthogonal to the axial direction of the arm,
wherein the first universal joint comprises a spherical rotating member having a through hole through which the supporting shaft is inserted and a ring-like retention ring that rotatably retains the spherical rotating member,
a male screw is formed on an outer periphery of the supporting shaft,
a pressing coil spring is provided on the supporting shaft so that the pressing coil spring is loosely fitted to the supporting shaft in a compressed state between an upper surface of the adsorption disk and a lower surface of the arm, and a regulation nut part that is screwed with the male screw on the supporting shaft on an upper surface side of the arm and regulates an upward movement of the arm is provided.

2. The device for repairing a crack in a wall according to claim 1, wherein
each of the plurality of contact members is formed of a shaft body provided at the rear end part of the arm such that the shaft body can move up and down, and is provided with a lock mechanism that locks each of the contact members at a desired position.

3. The device for repairing a crack in a wall according to claim 2, wherein,
the shaft body comprises a contact head that is adapted to contact the wall surface and a male screw rod that extends from the contact head and has a diameter smaller than that of the contact head,
at the rear end part of the arm, a rear end member in which a plurality of insertion holes into which the male screw rods of the plurality of the contact members are inserted are formed is provided,
the lock mechanism comprises
a pressing coil spring that is loosely fitted to the male screw rod in a compressed state between a lower surface of the rear end member and the contact head of the male screw rod, and
a lock nut that is screwed with the male screw rod on an upper surface side of the rear end member.

4. The device for repairing a crack in a wall according to claim 2, wherein the shaft body comprises a contact head that is adapted to contact the wall surface and a male screw rod that extends from the contact head and has a diameter smaller than that of the contact head, wherein
at the rear end part of the arm, a rear end member in which a plurality of insertion holes through which the male screw rods of the plurality of the contact members are inserted are formed is provided, and
the lock mechanism comprises lock nuts that are screwed with the male screw rod at each of a lower surface side and an upper surface side of the rear end member.

5. The device for repairing a crack in a wall according to claim 1, wherein distance L1 between the central axis of the supporting shaft and the central axis of the injection nozzle is shorter than the distance L2 between the central axis of the supporting shaft and the central axis of the contact member.

6. The device for repairing a crack in a wall according to claim 1, wherein
the regulation nut part comprises
a nut main body having a female screw that is screwed with the male screw of the supporting shaft, and
an operation flange that is integrally formed with the nut main body on the outer periphery of the nut main body in order to be grasped and to rotate the nut main body manually.

7. The device for repairing a crack according to claim 1, wherein
the regulation nut part comprises a pair of a first nut and a second nut provided on one end side of the first nut,
on an inner periphery of the first nut, a female screw that is screwed with the male screw on the supporting shaft is formed,
the first nut has, on part of the one end side, a tapered pipe having a tapered shape that extends along the inner periphery on which a female screw is formed and having an outer periphery that is narrowed from a base end to a front end, on an inner periphery of the second nut, a female screw that is screwed with the male screw of the supporting shaft is formed, and the second nut has, on part of one end side, a tapered recess that connects the outer periphery of the tapered pipe of the first nut.

8. The device for repairing a crack in a wall according to claim 1, wherein the second universal joint comprises a spherical rotating member having a through hole through which the inflow pipe is inserted and a ring-like retention ring that rotatably retains the spherical rotating member, a male screw is formed on an outer periphery of the inflow pipe, a pair of lock nut parts that is screwed with the male screw of the inflow pipe is formed on an upper surface side and a lower surface side of the arm to lock the inflow pipe, each of the pair of the lock nut parts comprises a nut main body in which a female screw that is screwed with the male screw of the inflow pipe is formed, and an operation flange that is integrally formed with the outer periphery of the nut main body in order to be grasped and to rotate the nut main body manually.

9. The device for repairing a crack in a wall according to claim 1, wherein the second universal joint comprises a spherical rotating member having a through hole through which the inflow pipe is inserted and a ring-like retention ring that rotatably retains the spherical rotating member, on an outer periphery of the inflow pipe, a male screw is formed, on an upper surface side and a lower surface side of the arm, a pair of lock nut parts is provided so that the pair of lock nut parts is screwed with the male screw of the inflow pipe to lock the inflow pipe is provided, of the pair of lock nut parts, at least the lock nut part on the lower surface side comprises a first nut and a second nut provided on one end side of the first nut, on an inner periphery of the first nut, a female screw that is screwed with the male screw of the inflow pipe is formed, the first nut has, on part of one end side, a tapered pipe having a tapered shape that extends along the inner periphery on which a female screw is formed and having an outer periphery that is narrowed from a base end to a front end, on an inner periphery of the second nut, a female screw that is screwed with the male screw of the inflow pipe is formed, the second nut has, on part of its one end side, a tapered recess, the tapered recess has a tapered surface that connects the outer periphery of the tapered pipe of the first nut, and by tightening of the second nut towards the first nut side, the tapered recess reduces a diameter of the tapered pipe to make the tapered pipe to press against the male screw of the inflow pipe.

10. The device for repairing a crack in a wall according to claim 1, wherein the adsorption disk comprises an adsorption main body that is fixed to the supporting shaft, and a ring-like packing that is provided in a protruded way on the adsorption main body, is adapted to elastically contact the wall surface and forms, on inside of the ring-like packing, a recess that communicates with the suction passage of the supporting shaft and is adapted to face to the wall surface, and wherein the adsorption main body is formed of a transparent resin.

11. The device for repairing a crack in a wall according to claim 1, wherein the nozzle part comprises a nozzle main body that is connected to the inflow pipe, a discharge port in a flared shape that gradually expands, and a resin-made cushioning member that is provided on an opening edge part of the nozzle main body and is adapted to elastically contact the wall surface.

12. The device for repairing a crack in a wall according to claim 11, wherein the nozzle main body has, on a periphery of the opening edge, an engaging projection that bites an outer periphery of the cushioning member and engages with the cushioning member.

13. The device for repairing a crack in a wall according to claim 1, wherein the device comprises a supply pipe that is connected with the inflow pipe for supplying filler to the inflow pipe, the supply pipe has a connection port connected to the inflow pipe, and a first branched pipe, a second branched pipe and a third branched pipe that communicate with the connection port and are branched in three directions, and each of the first branched pipe, the second branched pipe and the third branched pipe has a manual opening and closing valve for opening and closing the branched pipe.

14. The device for repairing a crack in a wall according to claim 1, wherein the device has a switching valve provided between the suction passage of the supporting shaft and a suction pipe from a vacuum pump, the switching valve comprises a spring that urges the switching valve to a normal position that validates the suction of the vacuum pump, and a push button that positions, against urging force of the spring, the switching valve at an working position where the suction passage is opened to the atmosphere to invalidate the suction by the vacuum pump.

* * * * *